(12) United States Patent
Axelsson et al.

(10) Patent No.: US 7,854,477 B2
(45) Date of Patent: Dec. 21, 2010

(54) SEAT BACK SUPPORT MECHANISM

(75) Inventors: Peter Axelsson, Vårgårda (SE); Lennart Simonsson, Vårgårda (SE); Clas Wergeland, Alingsås (SE)

(73) Assignee: Autoliv Development AB, Vargarda (SE)

( * ) Notice: Subject to any disclaimer, the term of this patent is extended or adjusted under 35 U.S.C. 154(b) by 29 days.

(21) Appl. No.: 11/792,268

(22) PCT Filed: Dec. 7, 2005

(86) PCT No.: PCT/SE2005/001845

§ 371 (c)(1),
(2), (4) Date: Jun. 4, 2007

(87) PCT Pub. No.: WO2006/068575

PCT Pub. Date: Jun. 29, 2006

(65) Prior Publication Data

US 2008/0100104 A1 May 1, 2008

(30) Foreign Application Priority Data

Dec. 20, 2004 (GB) .................................. 0427851.1

(51) Int. Cl.
*B60N 2/42* (2006.01)
(52) U.S. Cl. ........................ 297/216.13; 297/216.14; 297/216.1
(58) Field of Classification Search ............... 297/216.1, 297/216.13, 216.14
See application file for complete search history.

(56) References Cited

U.S. PATENT DOCUMENTS

| | | | | |
|---|---|---|---|---|
| 5,310,030 A | * | 5/1994 | Kawakita et al. ............ | 188/371 |
| 5,468,053 A | * | 11/1995 | Thompson et al. .......... | 297/472 |
| 5,531,404 A | * | 7/1996 | Marechal .................. | 244/118.6 |
| 5,697,478 A | * | 12/1997 | Di Stefano .................. | 188/371 |
| 5,730,459 A | * | 3/1998 | Kanda ......................... | 280/731 |
| 5,884,972 A | * | 3/1999 | Deptolla ................. | 297/378.11 |
| 6,024,406 A | * | 2/2000 | Charras et al. ......... | 297/216.14 |
| 6,053,571 A | * | 4/2000 | Faigle ..................... | 297/216.13 |
| 6,109,690 A | * | 8/2000 | Wu et al. ................ | 297/216.13 |
| 6,164,720 A | | 12/2000 | Haglund | |
| 6,254,181 B1 | * | 7/2001 | Aufrere et al. ........... | 297/216.1 |
| 6,296,306 B1 | | 10/2001 | Specht et al. | |
| 6,354,659 B1 | * | 3/2002 | Andersson et al. ..... | 297/216.14 |
| 6,523,893 B2 | * | 2/2003 | Kamper et al. ......... | 297/216.13 |
| 6,648,409 B1 | * | 11/2003 | Laporte ................... | 297/216.1 |

(Continued)

FOREIGN PATENT DOCUMENTS

EP 0 709 249 A3 6/1997

(Continued)

*Primary Examiner*—Sarah B McPartlin
(74) *Attorney, Agent, or Firm*—Harness, Dickey & Pierce, P.L.C.

(57) ABSTRACT

A seat back support mechanism supports the back of a seat in a motor vehicle. One component of the mechanism (15) is effectively connected to the seat of the motor vehicle and another component (32) is connected to the back (44) of the motor vehicle optionally by means of a recliner mechanism. The support mechanism comprises a connection between the components. The connection comprises two pivot links (27, 33). One pivot link (33) is of arcuate form with a central "V" notch so that when the back of the seat is subjected to a predetermined force, the back of the seat is permitted about a pivot axis (30) while the arcuate pivot link (33) is deformed, thus absorbing energy.

36 Claims, 14 Drawing Sheets

U.S. PATENT DOCUMENTS

Figure 1:
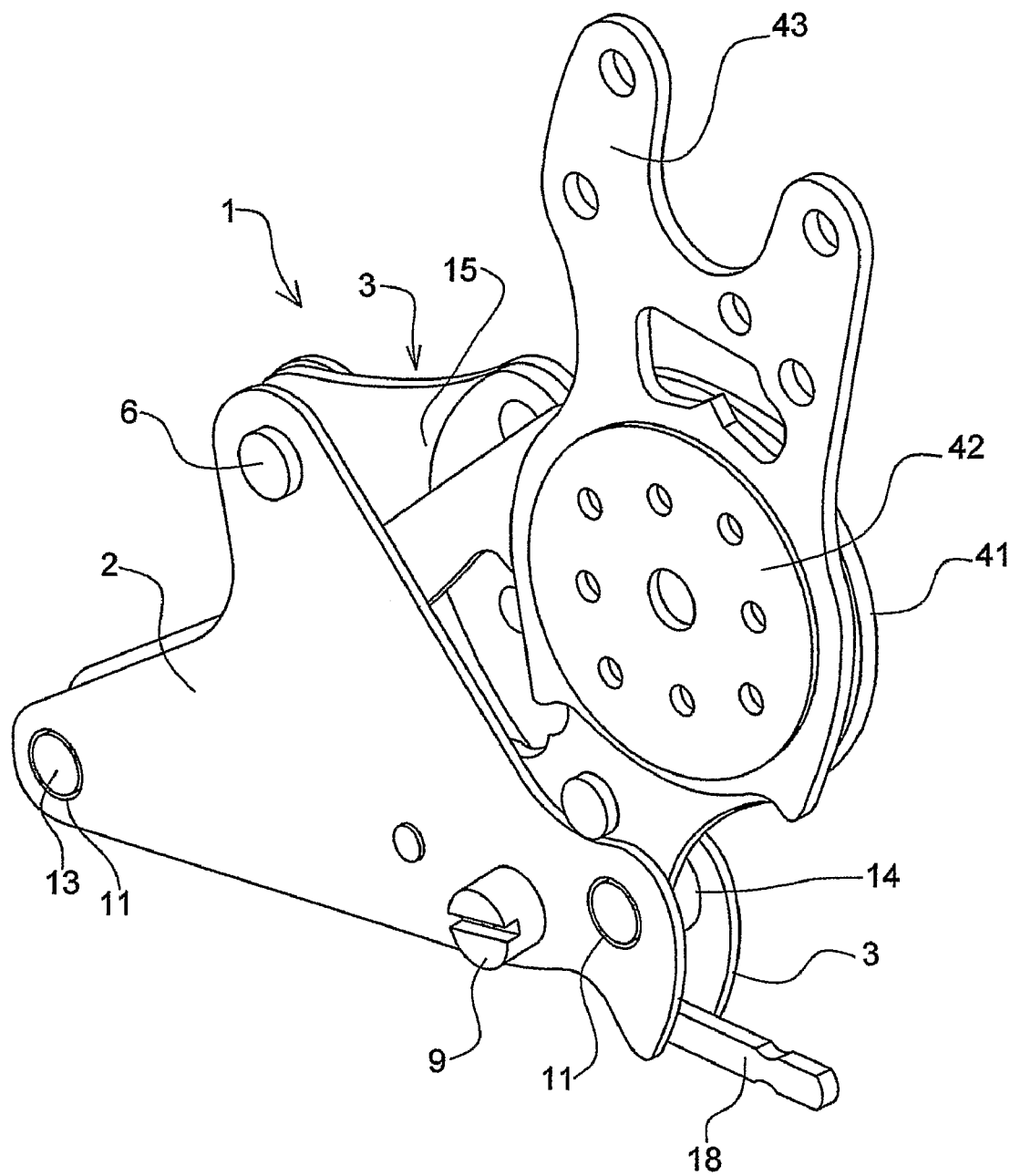

| | | | |
|---|---|---|---|
| 6,733,075 B2 * | 5/2004 | Schumann et al. | 297/344.12 |
| 6,786,543 B2 * | 9/2004 | Andersson et al. | 297/216.13 |
| 7,070,236 B2 * | 7/2006 | Kawashima | 297/216.14 |
| 2001/0011810 A1 * | 8/2001 | Saiguchi et al. | 280/728.1 |
| 2002/0024242 A1 * | 2/2002 | Becker et al. | 297/216.1 |
| 2002/0053792 A1 * | 5/2002 | Yamaguchi et al. | 280/748 |
| 2003/0042771 A1 * | 3/2003 | Teufel et al. | 297/216.1 |
| 2004/0061364 A1 | 4/2004 | Humer et al. | |
| 2004/0090101 A1 * | 5/2004 | Andersson et al. | 297/354.12 |
| 2005/0077763 A1 * | 4/2005 | Kawashima | 297/216.14 |
| 2005/0140190 A1 * | 6/2005 | Kawashima | 297/216.14 |

FOREIGN PATENT DOCUMENTS

| | | |
|---|---|---|
| GB | 2 255 151 A | 10/1992 |
| GB | 2 316 442 A | 2/1998 |
| GB | 2 370 221 A | 6/2002 |

* cited by examiner

SEAT BACK SUPPORT MECHANISM

THE PRESENT INVENTION relates to a seat back support mechanism and more particularly, relates to a seat back support mechanism for supporting the back of a seat intended to be mounted in a vehicle. A preferred seat back support mechanism in accordance with the invention may incorporate a recliner mechanism.

When a vehicle with a conventional seat is involved in a rear impact, the seat may be accelerated with a substantial forward acceleration since the seat is secured to the floor of the vehicle. The posterior and torso of an occupant of the vehicle sitting on the seat will consequently be accelerated, because of the intimate contact between the seat, and the back of the seat, and the posterior and torso of the occupant. The head of the occupant, however, is not in direct contact with the seat and, due to its inertia, will tend to remain stationary. Since the posterior and torso are being accelerated forwardly, this means that effectively the head of the occupant may move rearwardly relative to the torso, thus bending the neck of the occupant. This can cause injury to the occupant.

It is now believed that the risk of injury to an occupant of a vehicle can be diminished if the back of the seat is mounted in such a way that the top part of the seat back can move forwardly to support the head of the occupant and also in such a way that the seat back can subsequently "yield", at least to a predetermined extent, during a rear impact. In this way, the torso of the occupant can be caused to accelerate in a more gradual manner, and the head of the occupant can be supported thus reducing the risk of injury.

It has been proposed previously to provide a seat back support mechanism which yields during a rear vehicle impact. Such a mechanism is disclosed in GB-A-2316442. The mechanism disclosed in this prior publication supports a vehicle seat back and is configured so as to allow the base of the seat back to undergo a rearward translatory movement during a rear vehicle impact, which causes the top part of the seat back to move forwardly to support the head of an occupant of the seat. After the base of the seat back has undergone the rearward translatory movement, the mechanism permits the seat back to be tilted rearwardly, with energy being absorbed, in response to force exerted on the seat back by the occupant of the seat as a result of the rear impact. The mechanism incorporates a deformable element, which deforms when the mechanism allows the seat back to tilt rearwardly, with energy being absorbed by the deformable element as it is deformed.

The present invention seeks to provide an improved seat back support mechanism.

According to one aspect of the invention there is provided a seat back support mechanism for supporting the back of a seat in a motor vehicle, the seat back support mechanism comprising at least one first component adapted to be connected to the squab of the seat or to a frame supporting the squab of the seat, and at least one further component adapted to be connected to the back of the seat, the mechanism comprising a connection between the components, said connection including means to permit the said further component to move with a first pivotal action relative to the first component, and also with a second pivotal action relative to the first component, wherein a linkage is provided comprising two pivot link elements, the pivot link elements each being mounted to effect pivotal movement relative to said at least one first component, the pivot link elements directly or indirectly supporting said further component, the pivot link elements permitting said further component to effect an initial rearward pivotal movement which constitutes said first pivotal action before effecting said second pivotal action, there being a deformable element which resists said second pivotal action, said element being adapted to deform to permit the second pivotal action when subjected to a force in excess of a predetermined threshold, the mechanism further comprising a member which is moveable in response to movement of the said further component, the member being moveable into engagement with a deformable structure when the pivot link elements move to permit the said further component to effect the initial rearward pivotal movement.

Preferably the link elements are moveable relative to a support plate, and the deformable structure is formed integrally with said support plate.

In one embodiment the deformable structure is formed by a region of the support plate of reduced thickness which incorporates apertures.

In another embodiment the deformable structure is formed by at least one deformable finger.

In a further embodiment the deformable structure is formed from a plurality of deformable fingers, with each deformable finger being spaced apart from another deformable finger.

In a yet further embodiment the deformable structure is formed from one deformable finger, which is positioned in a recess in the support plate, such that when the member moves into engagement with the finger, and deforms the finger, the member moves into the recess, and upward movement of the member is restricted by an upper side of the recess.

In a still further embodiment the deformable structure is formed from a deformable strip which is positioned by a slit in the support plate, such that the member may deform the deformable strip and close the slit.

Preferably the deformable structure is mounted to said support plate.

In one embodiment the deformable structure is of a metal foam.

In another embodiment the deformable structure is a foam of plastics material.

According to another aspect of the invention there is provided a seat back support mechanism for supporting the back of a seat in a motor vehicle, the seat back support mechanism comprising at least one first component adapted to be connected to the squab of the seat or to a frame supporting the squab of the seat, and at least one further component adapted to be connected to the back of the seat, the mechanism comprising a connection between the components, said connection including means to permit the said further component to move with a first pivotal action relative to the first component, and also with a second pivotal action relative to the first component, wherein a linkage is provided comprising two pivot link elements, the pivot link elements each being mounted to effect pivotal movement relative to said at least one first component, the pivot link elements directly or indirectly supporting said further component, the pivot link elements permitting said further component to effect an initial rearward pivotal movement which constitutes said first pivotal action before effecting said second pivotal action, there being an element which resists said second pivotal action, said element being adapted to deform to permit the second pivotal action when subjected to a force in excess of a predetermined threshold, the mechanism further comprising a member which is moveable in response to movement of the said further component, and a moveable blocking element, the moveable blocking element being moveable from an initial position in which the blocking element does not impede a predetermined movement of the member to a blocking position in which the blocking element at least partly impedes the predetermined movement of the member.

Preferably the blocking element is mounted to be moved to the blocking position by inertia.

Conveniently the blocking element is biased towards the initial position by a biasing arrangement, and the blocking element is moveable to the blocking position by the force arising from the inertia of the blocking element, if the force arising from the inertia of the blocking element is in excess of the biasing force.

Advantageously the biasing arrangement comprises a leaf spring.

Preferably the blocking element incorporates a weight and the blocking element is moveable to the blocking position by the force arising from the moment of inertia of the weight In one embodiment the seat back support mechanism incorporates a control unit which is connected to a sensor for sensing the severity of a rear impact to the vehicle, the control unit controlling a motor to move the blocking element to the blocking position.

In another embodiment the blocking element is at least partly deformable, such that, in use, energy may be absorbed when the member moves into engagement with the blocking element.

Preferably the blocking element is biased by a biasing arrangement towards the initial position, the blocking element having a first section and a second section, the first section being moveable if the member exerts a force on the first section which is in excess of a predetermined level, and the second section being moveable as a consequence of movement of the first section, with the second section being moveable to a position in which the second section at least partly impedes the predetermined movement of the member.

In one embodiment the said first section is connected to the said second section to define a substantially L shaped member, with a corner section being formed where the first section is connected to the second section, with the L shaped member being pivotally mounted at its corner section.

Preferably the L shaped member is biased by a biasing arrangement towards an initial position in which a section of the L shaped member impedes movement of the member in one direction and allows the predetermined movement of the member.

Conveniently the L shaped member is moveable in response to a force exerted by the member on the said first section of the L shaped member which exceeds the biasing force of the biasing arrangement, and the movement is such that said second section of the L shaped member is moved to the blocking position in which the second section of the L shaped member at least partly impedes the predetermined movement of the member.

Advantageously the blocking element is retained in the initial position by a frangible element, which may be broken if a force exerted on the blocking element is in excess of a predetermined level.

In one embodiment the blocking element is biased by a biasing arrangement towards the initial position, the blocking element having a first section and a second section, the blocking element being pivotally mounted, at a point between the first section and the second section, the moment of inertia of one section about the pivot being greater than the moment of inertia of the other section about the pivot, with the blocking element being moveable in response to a predetermined acceleration as a consequence of the different moments of inertia.

Preferably the blocking element is biased by a biasing arrangement towards the initial position, and the blocking element being moveable to the blocking position in response to a force generated by the said moment of inertia in response to acceleration when the generated force is greater than the biasing force.

Conveniently a slit is formed in the first section of the blocking element, and the blocking element is pivotally mounted on a rod accommodated in an upper part of the slit.

Advantageously the width of the slit is less than the diameter of a pivot rod.

Conveniently the blocking element is moveable in a translatory movement relative to the pivot mount, in response to a force exerted by the member on the blocking element which is in excess of a predetermined level, to allow the member to undergo the said predetermined movement.

Preferably the said deformable element is of arcuate form, each of the opposed ends of the deformable element being connected to a respective one of said components, the said two ends being adapted to be moved towards one another, with a consequent collapsing of the deformable element, as the said further component effects said second pivotal movement relative to said first component.

Conveniently the deformable element is provided with a notch on the interior of the arc to assist in the deformation of said element.

Advantageously one of the pivot link elements comprises the deformable element.

Preferably the said deformable element is connected by a pivot pin to an integer supporting the further component, the pivot pin extending into a guide aperture which is fixed in position.

Conveniently the integer supporting the further component comprises a recliner support plate which supports a recliner mechanism, the recliner mechanism comprising a support arm which constitutes the said further component.

Advantageously release means are provided to prevent premature movement of the pivot links.

Preferably the release means comprise frangible means.

Conveniently the release means comprise mechanically or electro-mechanically operated release means.

Advantageously the said means to permit the further component to move with a first and second pivotal action are connected to a support plate which is mounted to effect a pivotal motion relative to said first component, means being provided to lock the support plate in position.

Preferably the means provided to lock the support plate in position comprise a pivotally mounted lever which initially engages the support plate to lock the support plate in position, and is movable to a position in which the lever is disengaged from the support plate to permit a pivoting movement of the support plate.

The invention also relates to a vehicle seat incorporating a seat back support mechanism as described above.

Figure 2:
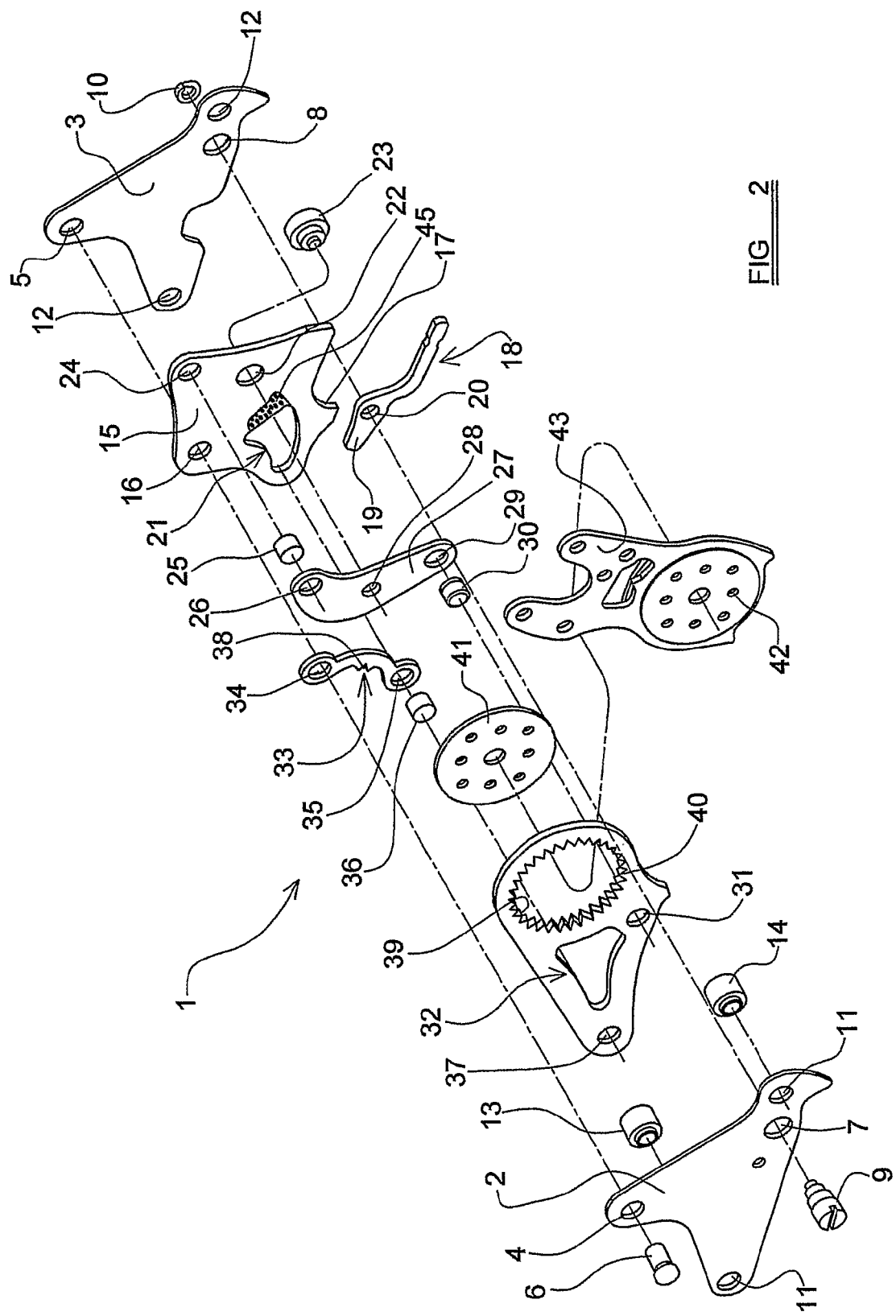
Figure 3:
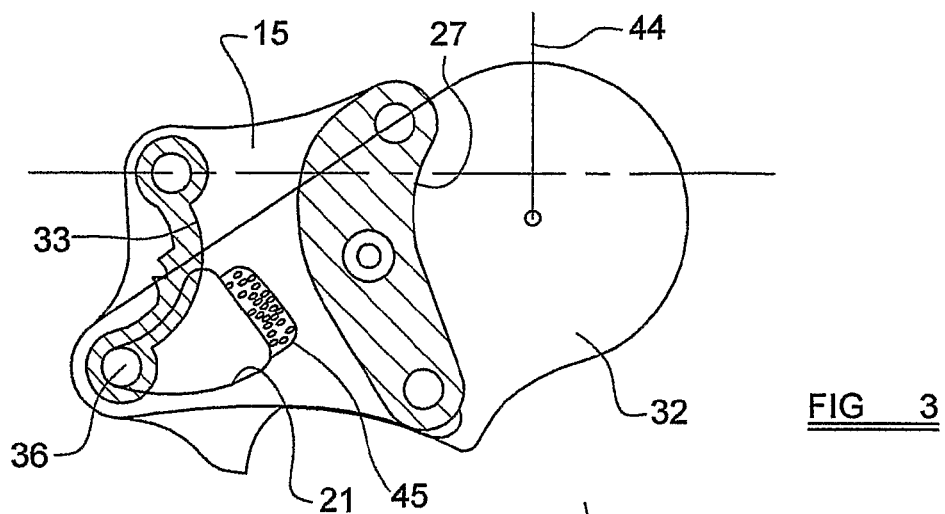
Figure 4:
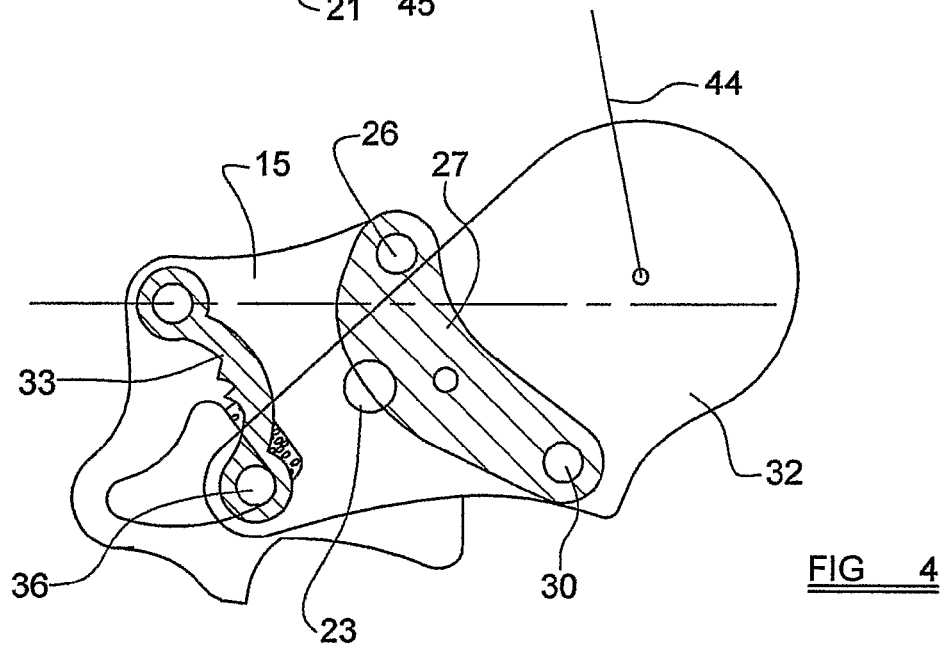
Figure 5:
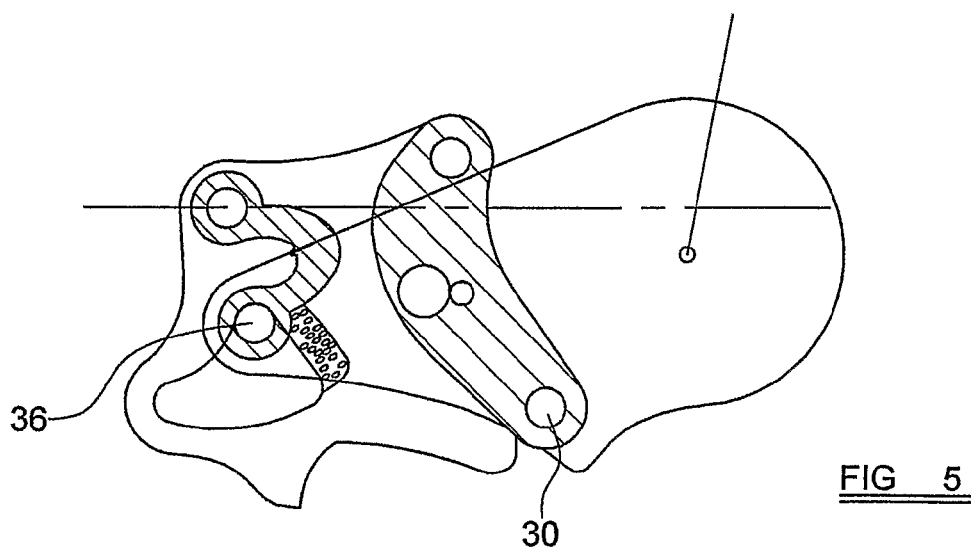
Figure 6:
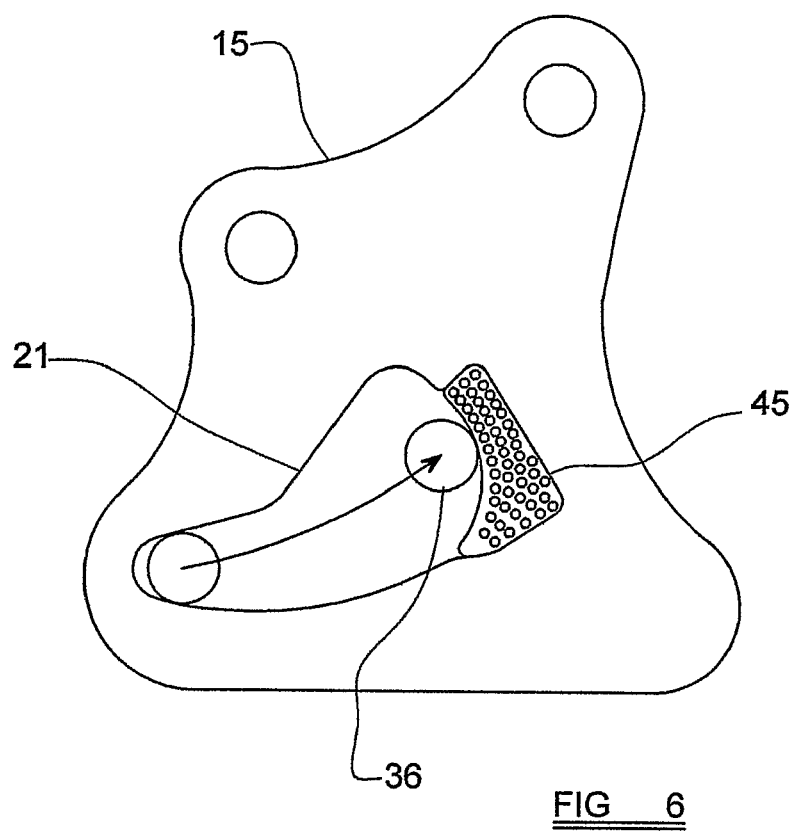
Figure 7:
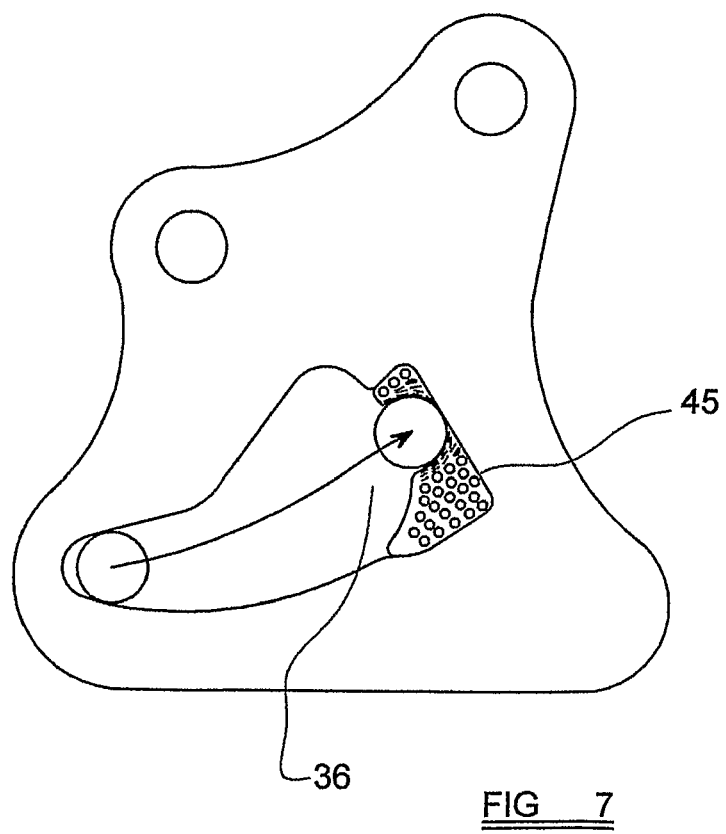
Figure 8:
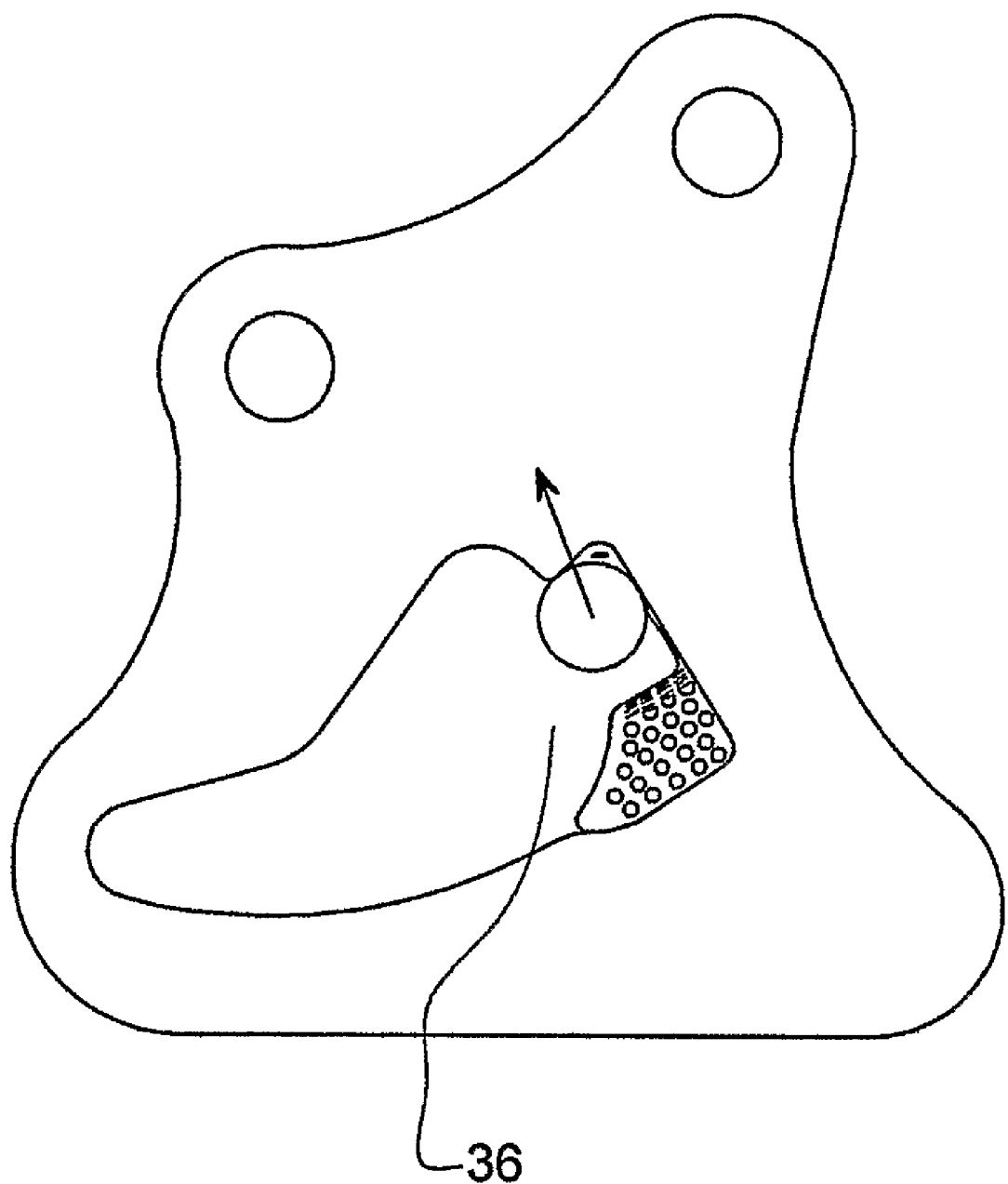
Figure 9:
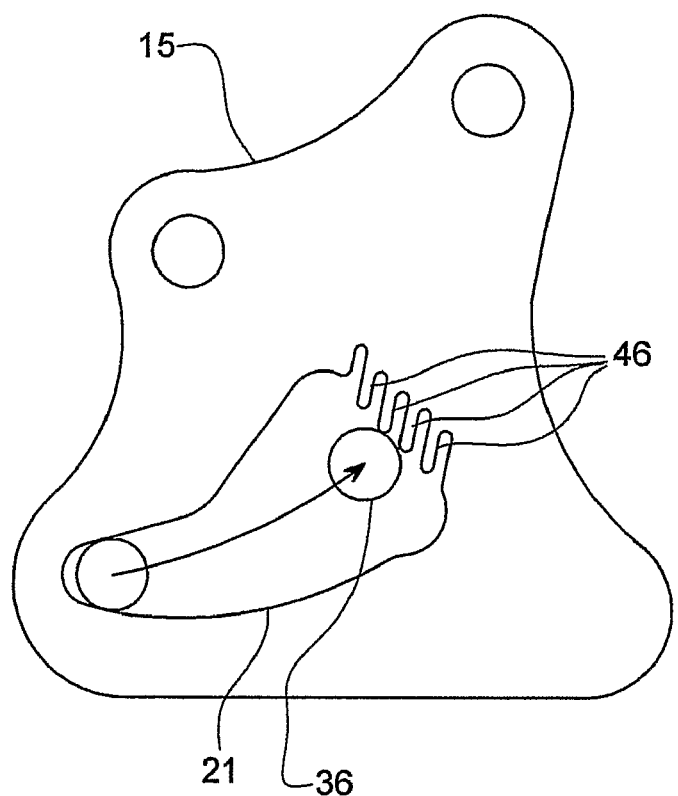
Figure 10:
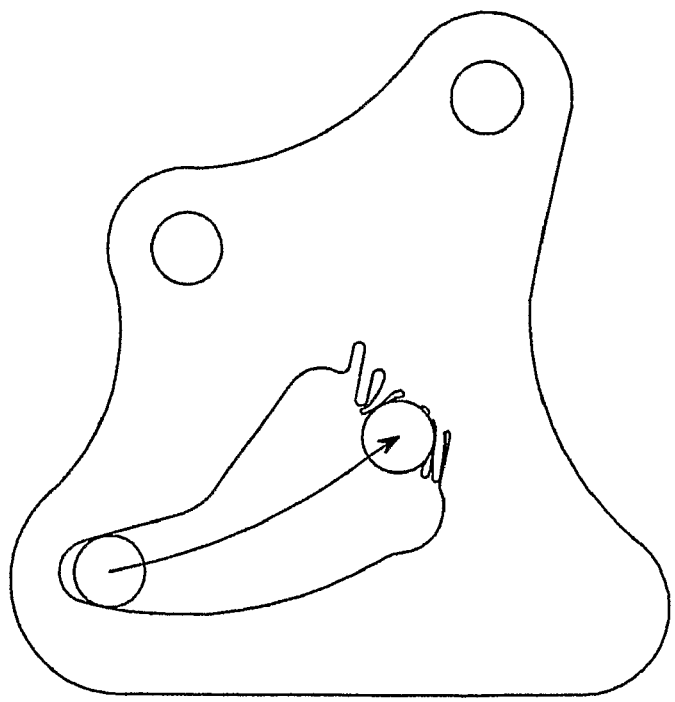
Figure 11:
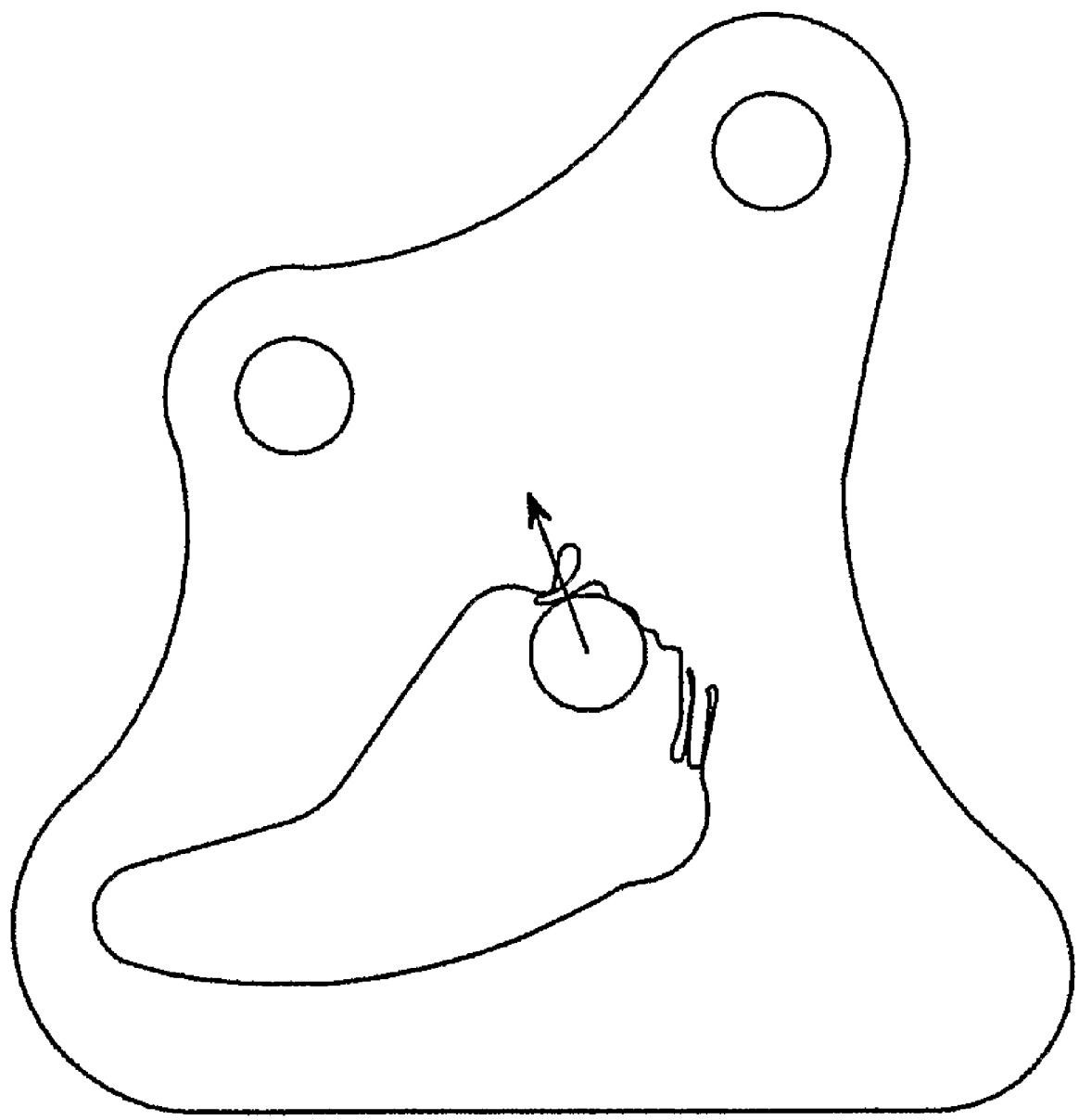
Figure 12:
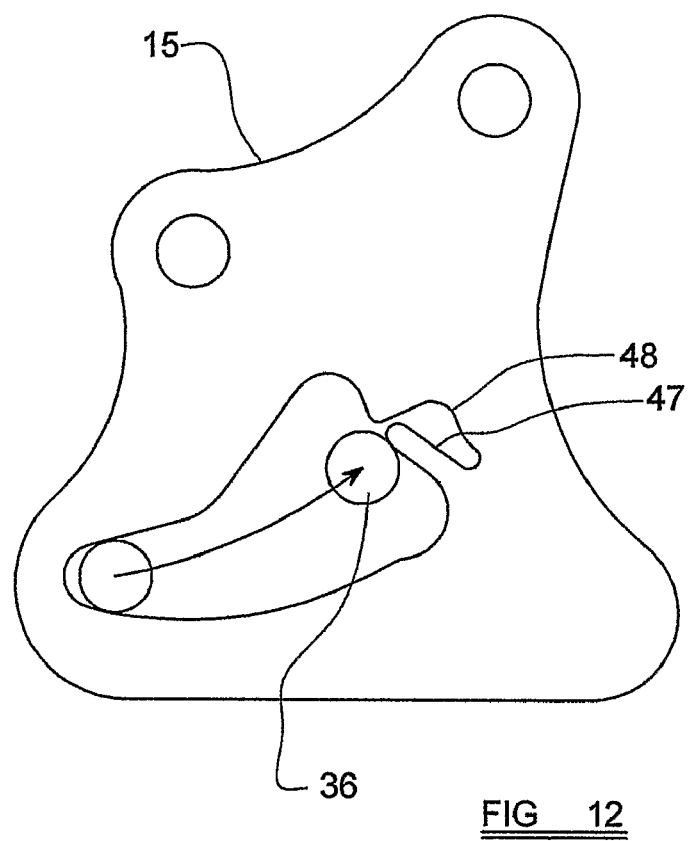
Figure 13:
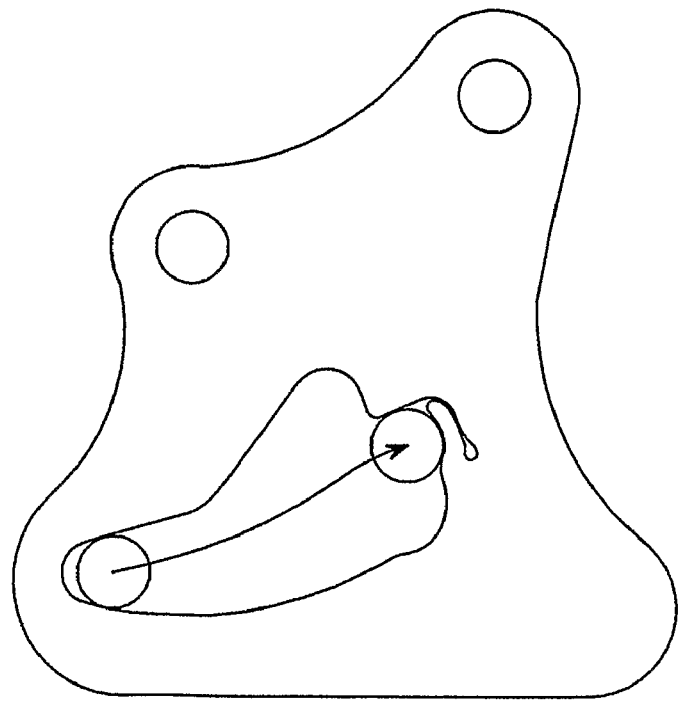
Figure 14:
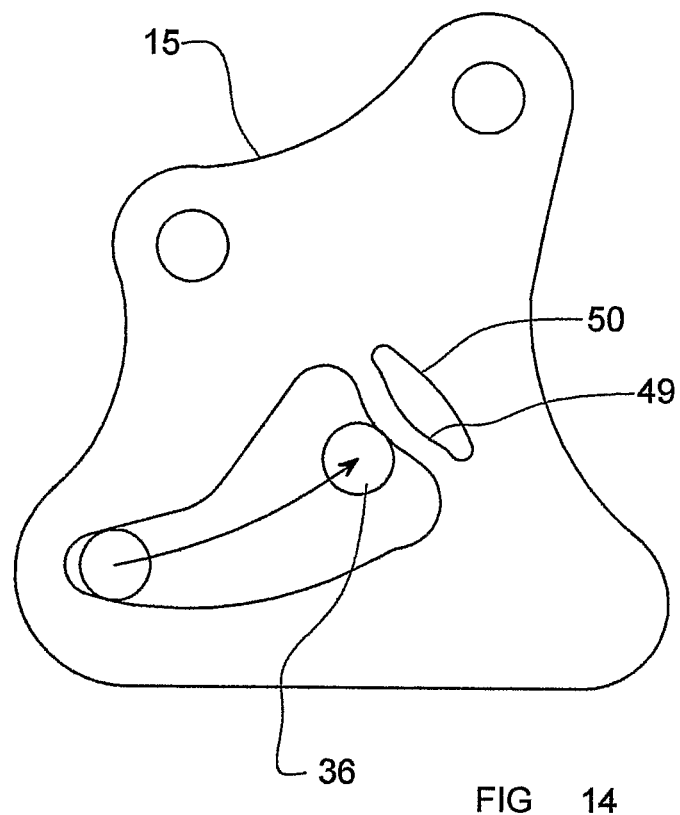
Figure 15:
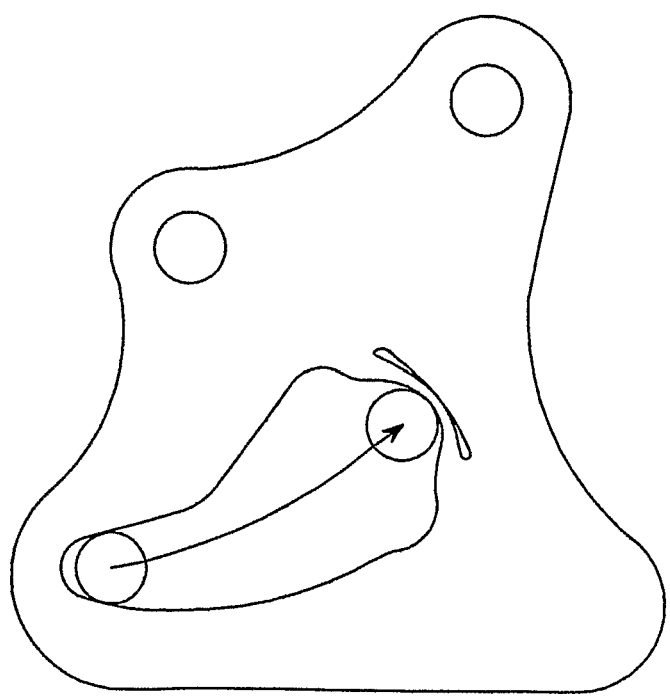
Figure 16:
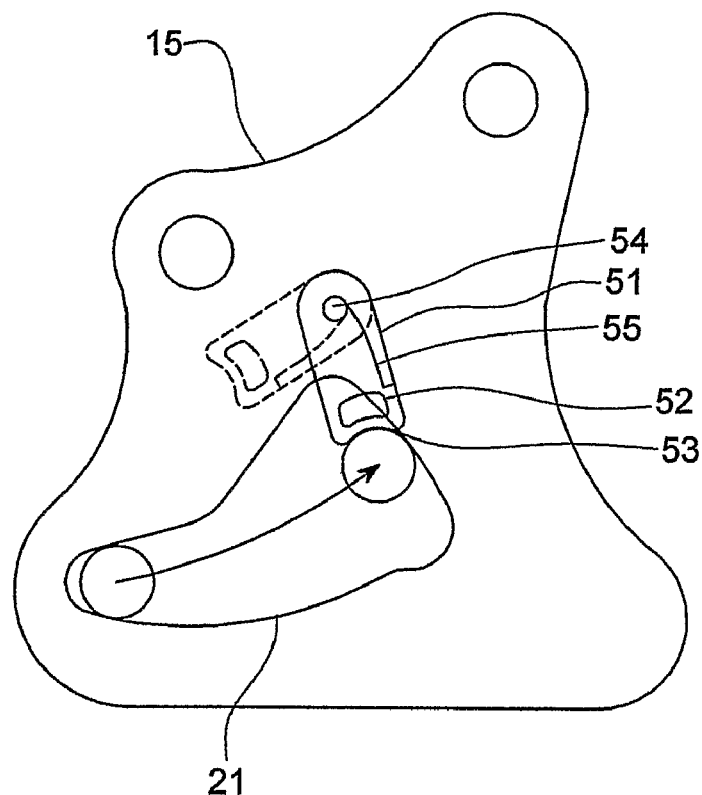
Figure 17:
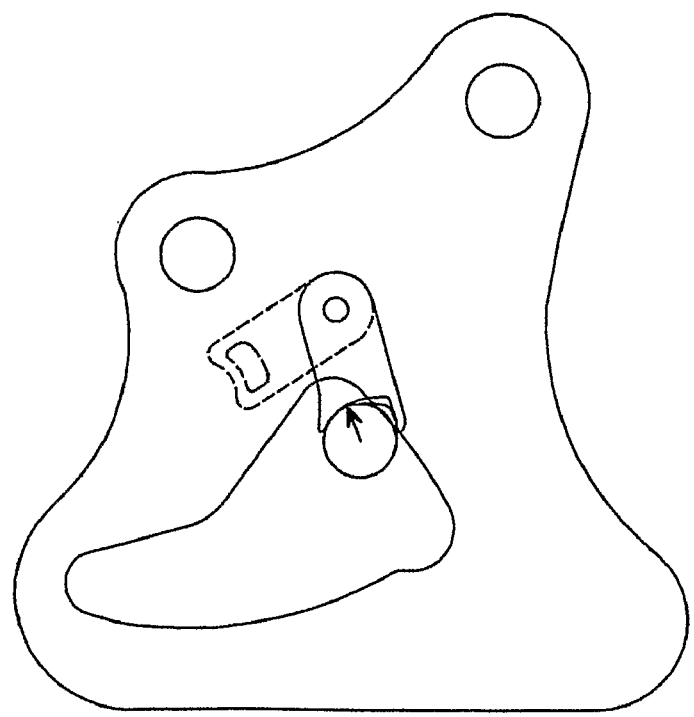
Figure 18:
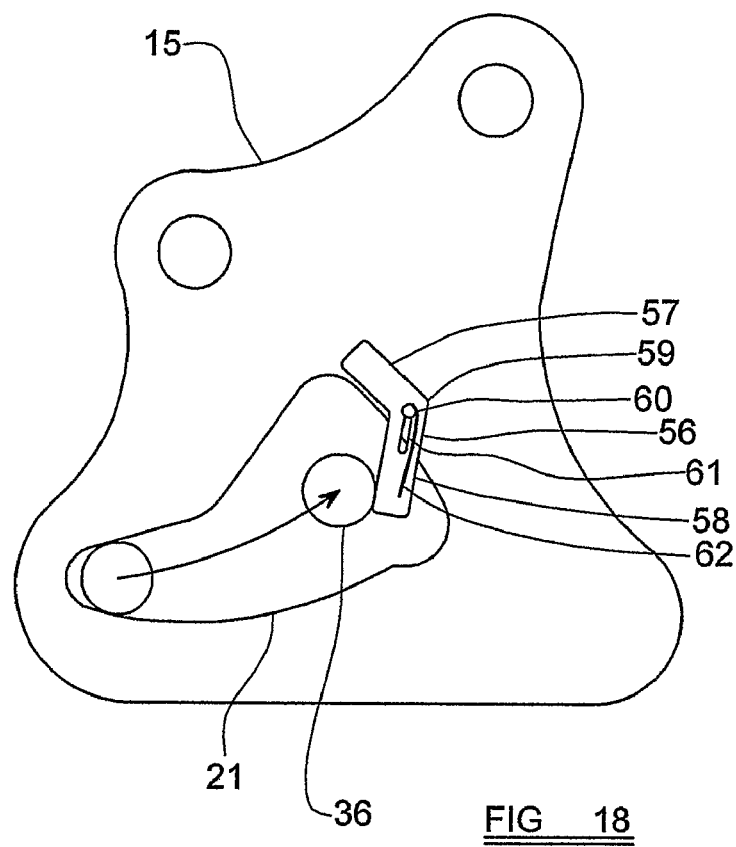
Figure 19:
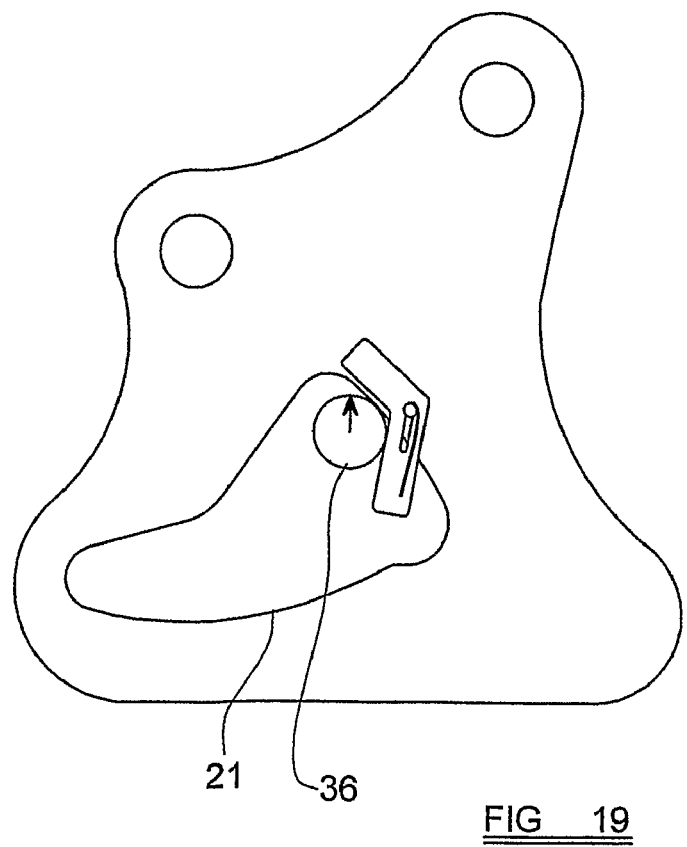
Figure 20:
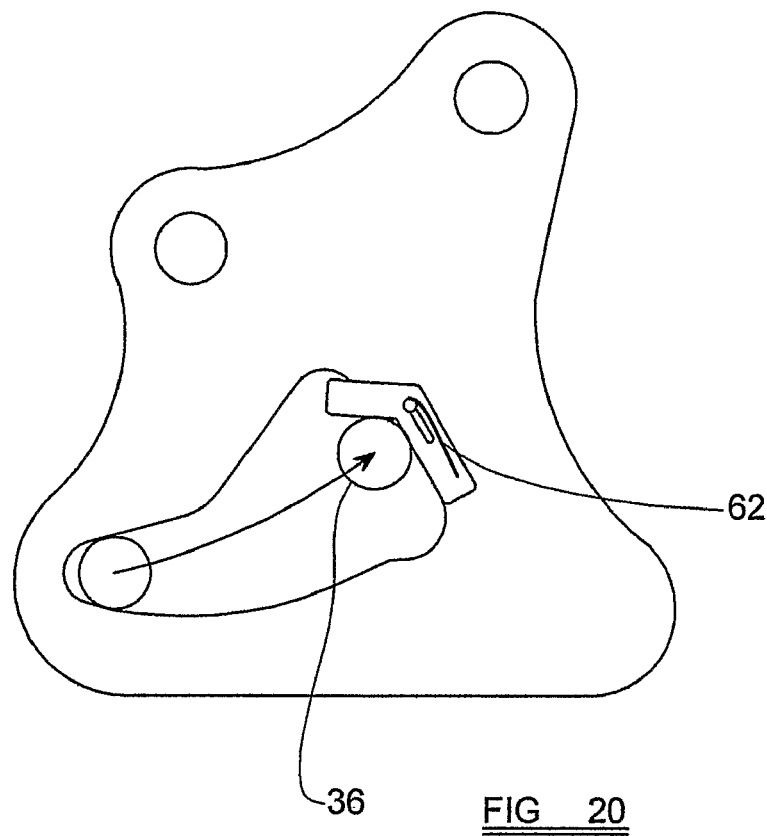
Figure 21:
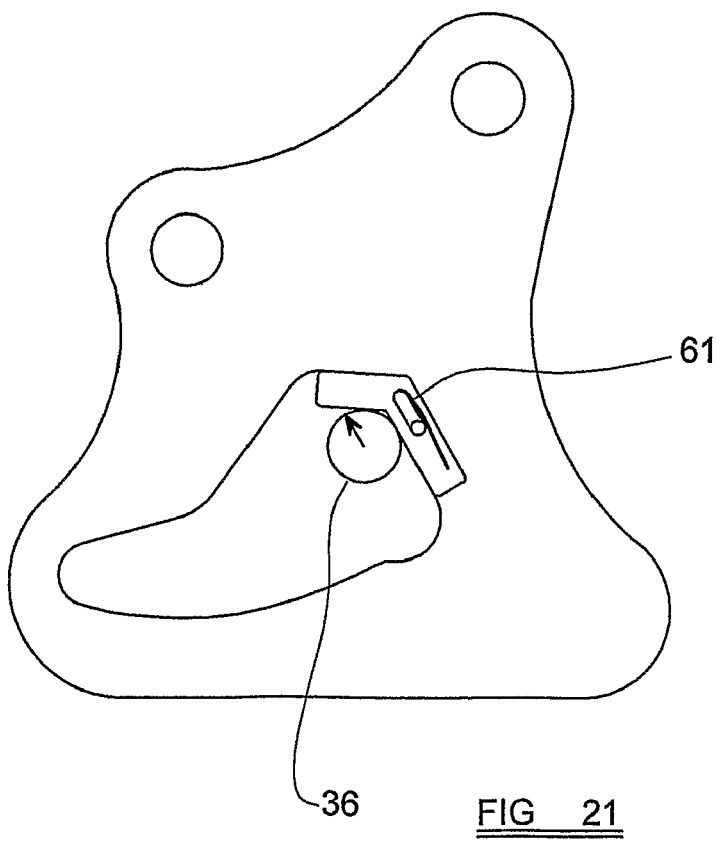
Figure 22:
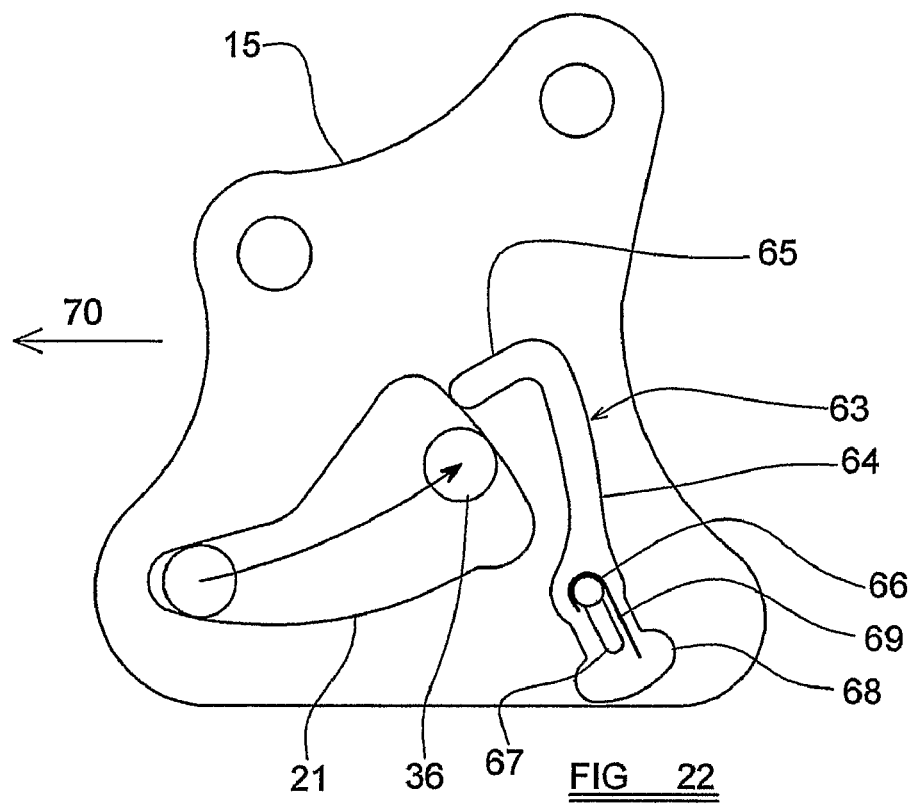
Figure 23:
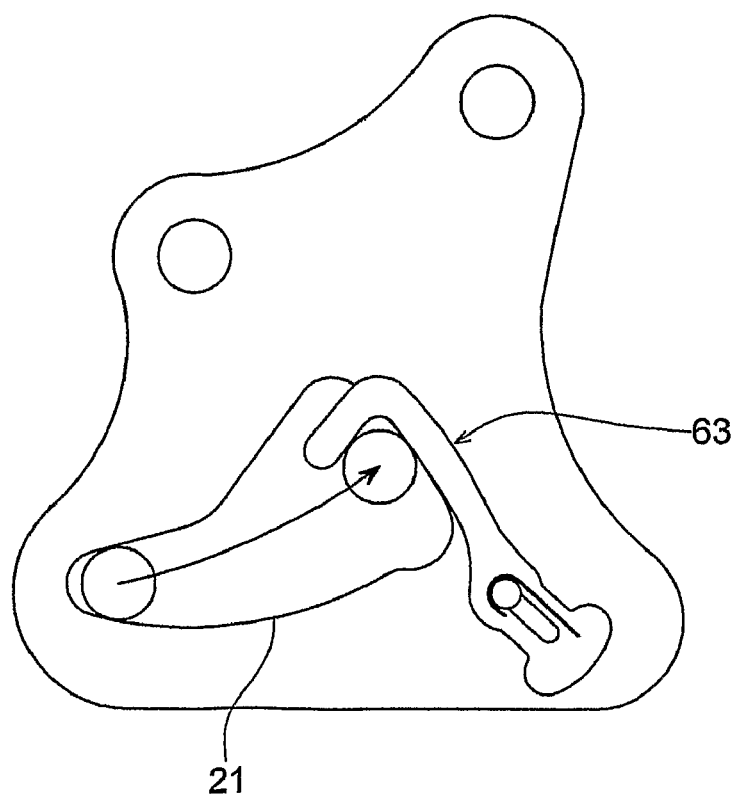
Figure 24:
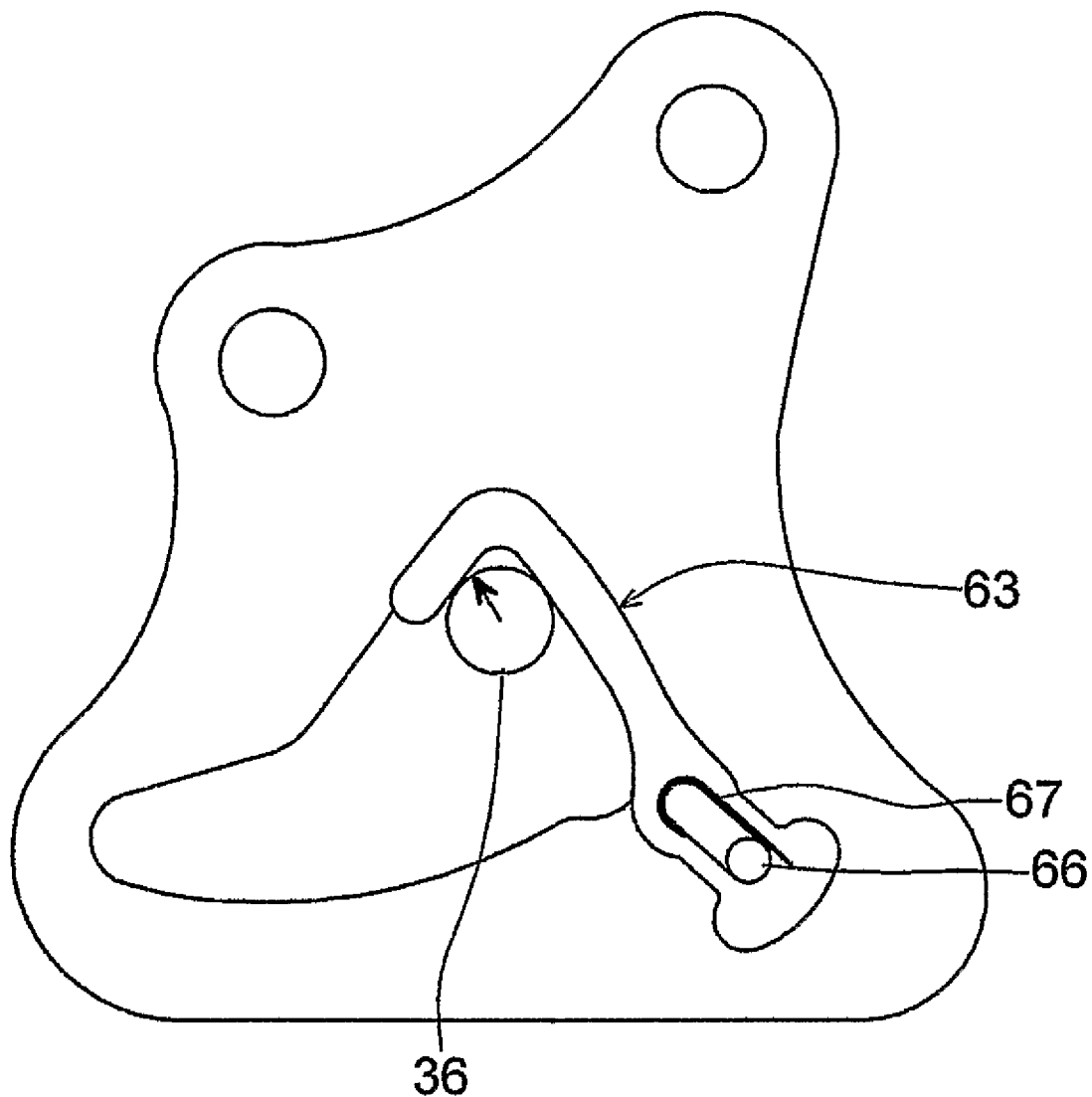

In order that the invention may be more readily understood, and so that further features thereof may be appreciated, the invention will now be described, by way of example, with reference to the accompanying drawings in which:

FIG. 1 is a perspective view of a seat back support mechanism in accordance with a preferred embodiment of the invention, FIG. 2 is an exploded view of the seat back support mechanism of FIG. 1, FIG. 3 is a plan view of four co-operating parts of the mechanism shown in FIGS. 1 and 2 in a first condition, FIG. 4 is a view corresponding to FIG. 3 showing the four parts in a second condition, FIG. 5 is a view corresponding to FIGS. 3 and 4 showing the four parts in a third condition, FIG. 6 is a view corresponding to FIG. 3, showing a pivot pin moving into engagement with a deformable structure during a severe rear impact, FIG. 7 is a view corresponding to FIG. 6, showing the pivot pin deforming the deformable structure, FIG. 8 is a view corresponding to FIGS. 6 and 7, with the pivot pin having moved upwardly, through the deformable structure, FIG. 9 is a view corresponding to FIG. 6, but with an alternative deformable structure, FIG. 10 is a view of the embodiment of FIG. 9, with the deformable structure having been deformed, FIG. 11 is a is a view corresponding to the embodiments shown in FIGS. 9 and 10, with a pivot pin having moved upwardly through the deformable structure, FIG. 12 is a view corresponding to FIG. 6, but with yet another deformable structure, FIG. 13 is a view of the embodiment of FIG. 12, with the deformable structure having been deformed, FIG. 14 is a view corresponding to FIG. 6, but with a further deformable structure, FIG. 15 is a view of the embodiment of FIG. 14, with the deformable structure having been deformed, FIG. 16 is a view corresponding to FIG. 6 of yet another embodiment of the invention during a severe rear impact, FIG. 17 is a view of the embodiment of FIG. 16, with a deformable structure having been deformed, FIG. 18 is a view corresponding to FIG. 6 of yet a further embodiment of the invention in an initial condition, FIG. 19 is a view of the embodiment of FIG. 18, in a low or average severity impact, FIG. 20 is a view of the embodiment of FIG. 18, in a severe impact, FIG. 21 is a view of the embodiment of FIG. 18, in a very severe impact, FIG. 22 is a view corresponding to FIG. 6 of another embodiment of the invention in an initial condition, FIG. 23 is a view of the embodiment of FIG. 22 in a severe impact, and FIG. 24 is a view of the embodiment of FIG. 22, in a very severe rear impact.

Referring initially to FIGS. 1 and 2 of the accompanying drawings, a seat back support mechanism 1 is adapted to be mounted between the squab of the seat, or a frame supporting the squab of the seat, which is connected to the floor of the motor vehicle, and the back of the seat. The mechanism is adapted to provide a "recliner" effect and is also provided with means which can be actuated to permit the back of the seat to be tilted forwardly, which may prove convenient if, for example, the seat is the front seat in a two-door motor car. As will be described, the support mechanism is so designed, that during a rear impact, the back of the seat may effect a first movement relative to the squab of the seat, if the force applied to the back of the seat exceeds a certain limit in which the lower part of the back of the seat moves rearwardly and the top part of the back of the seat moves forwardly. Subsequently the back of the seat may effect a movement, if the force applied to the back of the seat is in excess of a predetermined threshold, during which the back of the seat effectively tilts rearwardly, with the bottom part of the back of the seat remaining substantially stationary and the top part of the back of the seat moving rearwardly.

Considering the components that together constitute the mechanism 1 as illustrated in FIGS. 1 and 2, it is to be understood that the mechanism comprises a front main support plate 2 of substantially triangular form, and a rear main support plate 3 of a substantially corresponding form, the plates 2 and 3 forming the outer parts of the mechanism, the remaining components being located between the outer plates 2 and 3.

The front main support plate 2 is provided with a first aperture 4 co-aligned with a corresponding first aperture 5 formed in the rear main support plate 3. A bearing 6 passes through these apertures and pivotally supports two intermediate components as will be described hereinafter.

The front main support plate 2 defines a further aperture 7 which is co-aligned with a corresponding further aperture 8 formed in the rear main support plate 3. A bolt 9 is provided which passes through the co-aligned apertures 7 and 8, the bolt 9 being associated with a nut 10 located adjacent the rear main support plate 3. One intermediate element is pivotally mounted on a bearing surface provided on the bolt 9, as will be described hereinafter.

The front main support plate 2 defines two further apertures 11, and the rear main support plate defines two further co-aligned apertures 12. Each pair of apertures 11,12 receives a respective spacer element 13,14, the spacer elements being located between the front and rear main support plates.

The front and rear main support plates 2,3 are provided with means to mount the described mechanism in position on the squab of a vehicle seat or on a frame which supports the squab of a vehicle seat.

The bearing 6 pivotally supports an intermediate support plate 15. The intermediate support plate 15 defines a first aperture 16 which receives the bearing 6. The intermediate support plate 15 can thus pivot about an axis defined by the aperture 16 and the bearing 6. The lower part of the intermediate support plate defines a recess 17. A locking lever 18 is provided having a forward end 19 which has an exterior profile corresponding to the profile of the recess 17. The locking lever 18 has formed therein an aperture 20 which is located between the forward end 19 and a protruding handle portion. The aperture 20 of the locking lever 18 receives the bearing on the bolt 9 so the locking lever is pivotally mounted for pivotal rotation about the axis defined by the bolt 9. The locking lever 18 is mounted in a position which is co-planar with the intermediate support plate 15. The locking lever 18 may move from a first position, in which the forward end 19 of the locking lever is snugly received within the recess 17, thus preventing rotation of the intermediate support plate 15 in either sense about the axis defined by the bearing 6 and the aperture 16, and a release position, in which the forward end 19 of the locking lever 18 is disengaged from the recess, thus permitting the intermediate support plate 15 to pivot in a forward direction (i.e. a counter clockwise direction as viewed in FIGS. 1 and 2) about the axis defined by the bearing 6 and the aperture 16. This movement can be effected when it is desired to tilt the back of the seat forwardly.

The intermediate support plate 15 defines a substantially triangular guide aperture 21, the function of which will become clear from the following description.

A deformable structure is mounted to or formed integrally with the support plate 15 so that one edge of the deformable structure forms an edge of the triangular guide aperture 21. In this preferred embodiment the intermediate support plate 15 is of metal and the deformable structure is defined by an apertured region 45 of the intermediate support plate 15. The apertured region 45 is a region of the intermediate support plate 15 of reduced thickness which has a plurality of holes drilled through it. The apertures in the relatively thin apertured region 45 make the apertured region 45 readily deformable. As, in this preferred embodiment, the apertured region 45 is formed integrally with the intermediate support plate 15, the material forming the apertured region 45 is of metal, and is plastically deformable. One edge of the apertured region 45 defines one edge of the triangular guide aperture 21.

The function of the deformable structure will become clear from the following description.

The intermediate support plate 15 defines an aperture 22 which receives part of a release element 23, the function of which will become clear from the following description.

The intermediate support plate 15 defines a further aperture 24 which receives a pivot pin 25 which is also received in an aperture 26 formed in one end of an elongate pivot link 27. The link 27 is thus mounted for pivotal movement about an axis defined by the pivot pin 25.

The pivot link 27 is of elongate form. At the centre of the pivot link 27 is an aperture 28. In an initial position of the pivot link, the aperture 28 in the link 27 is co-aligned with the aperture 22 in the intermediate support plate 15. The release element 23 which is engaged with the aperture 22 has a small extending frangible stud which is located in the aperture 28. The stud thus serves to maintain the pivot link 27 in its initial position. The pivot link 27 defines, at the end remote from the aperture 26, a further aperture 29, that further aperture 29 receiving a further pivot pin 30. The pivot pin 30 is received in an aperture 31 formed in a recliner support plate 32. The recliner support plate 32 will be described in greater detail hereinafter.

A second pivot link 33 is provided which effectively co-operates with the first pivot link 27 to provide a parallel linkage between the intermediate support plate 15 and the recliner support plate 32. The second pivot link 33 is of arcuate form having a first aperture 34 at one end, which receives the bearing 6, and having a second aperture 35 at the other end, which receives a pivot pin 36, the pivot pin 36 also being received in an aperture 37 provided for that purpose in the recliner support plate 32. It is to be noted, however, that part of the pivot pin 36 extends to the other side of the second pivot link 33 and is received within the triangular guide aperture 21 formed in the intermediate support plate 15. The pivot pin 36 forms a member which is connected to one of the link elements 27,33.

The second pivot link 33 is of arcuate form. A "V" notch or recess 38 is provided substantially at the mid point of the link on the interior side of the arc.

The recliner support plate 32 is, of itself, of substantially conventional form, defining an aperture 39 that is provided, about its periphery, with a plurality of inwardly directed teeth 40. The aperture thus effectively forms the ring gear for a planetary gear system. The planetary gear system is mounted between two carrier plates 41,42. The carrier plate 42 is formed integrally with a support arm 43 that is adapted to be connected to the frame forming the back of a seat.

It is to be appreciated that a seat back support mechanism, as described with reference to FIGS. 1 and 2, will be provided on each side of the seat, the support arms 43 engaging two arms of an inverted "U"-shaped frame that forms an essential component of the back of the seat.

It is to be appreciated that the planetary gear mechanism comprising the aperture 39, the carrier plates 41 and 42 and the associated co-operating gears may be provided with an adjusting knob, to enable the degree of inclination of the back of the seat to be adjusted, and is conventional.

It will now be understood more clearly that when the locking lever 18 is moved, by actuating the handle, to a position in which the forward end 19 is disengaged from the recess 17, the intermediate plate 15 can be tilted forwardly, effecting a pivotal motion about the axis defined by the bearing 6. The pivot link 27 is locked to the intermediate plate 15 by the release element 23 and consequently, when the lock lever is disengaged from the intermediate support plate 15, the back of the seat may be tilted forwardly. This may be appropriate if the seat is a front seat in a two door car and access is required to the rear of the car.

Reference is now made to FIGS. 3 to 5, which illustrate the relative position of the intermediate support plate 15, the first pivot link 27 and the second pivot link 33 together with the position of the recliner support plate 32. These four components together effect a predetermined movement when a vehicle in which the seat back support mechanism is provided is involved in a rear impact.

FIG. 3 illustrates the four components of interest, when in an initial condition. It is to be observed that the pivot pin 36, at the lower end of the second pivot link 33, is located at a forward position within the generally triangular aperture 21 formed in the intermediate support plate 15. The recliner support plate 32 is in such an orientation that the back of the seat (with the particular adjustment of the recliner mechanism illustrated) is vertical, as indicated by the line 44.

If the vehicle is subjected to a rear impact of average or low severity, a rearwardly directed force is applied to the back of the seat. The force is typically initially applied to the lower part of the backrest of the seat by the posterior of the seat occupant, or the lower part of the torso of the seat occupant, due to the inertia of the seat occupant. This initially causes the pivot links 27,33, to commence a rearward pivoting motion. The rearward pivoting motion of the links is only permitted to proceed if the force applied to the back of the seat is sufficiently large to break the frangible part of the release element 23 that is received within the aperture 28 of the first link 27. Thus, if the rear impact is only a very gentle rear impact, the seat remains in its initial condition. However, if the impact is in excess of a predetermined severity, the frangible part will break, thus permitting the pivot links to move. The pivot links then move to the condition illustrated in FIG. 4.

It is to be observed that the pivot pin 36, provided at the lower end of the pivot link 33, has now moved to a rearward position at the bottom of the generally triangular aperture 21 formed in the intermediate support plate 15. The first pivot link 27 has effected a rearward swinging motion about the axis defined by the pivot pin 25 which is received in the aperture 24 of the intermediate support plate 15 and the aperture 26 of the pivot link 27.

As a consequence the recliner support plate 32 (which is effectively connected to the pivot pin 36) has moved rearwardly, and the inclination of the recliner support plate 32 has changed so that the seat back is now inclined slightly forwardly, as can be seen from the orientation of the line 44 in FIG. 4.

It is to be understood that during this movement of the back of the seat, the posterior or lower part of the torso of the occupant has effectively engaged the lower part of the back of the seat and moved the lower part of the back of the seat rearwardly. Consequently, the top of the back of the seat is moved forwardly and either the top of the back of the seat or a head-rest carried by the top of the back of the seat will be brought into engagement with the head of the occupant to support the head of the occupant.

Should a continuing rearward force be applied to the back of the seat, that force will tend to pivot the recliner support plate 32 about the axis of the pivot pin 30 which is provided at the lower end of the pivot link 27. This movement with a pivotal action is initially resisted by the second pivot link 33. However, because the second pivot link 33 is of arcuate form, and especially because of the provision of the "V" notch 38 on the inner surface of the arc, the second pivot link 33 can only withstand a predetermined force tending to compress that pivot link. If the force applied to the back of the seat is beyond a predetermined threshold, the second pivot link 33 will collapse and deform, permitting the recliner support plate 32 to pivot about the axis defined by the pivot pin 30, while absorbing energy.

It is to be understood that the predetermined threshold for the force that must be applied to the back of the seat to cause the second pivot link to collapse is greater than the force necessary to be applied to the back of the seat to cause the frangible part of the release element 23 to break, thus permitting movement of the first pivot link 27.

The pivot pin 36 provided at the lower end of the second pivot link 33 thus moves upwardly, within the triangular aperture 21 formed in the intermediate support plate 15, to occupy a position adjacent the upper-most corner of that triangular aperture. As can be seen in FIG. 5, the second pivot link 33 has collapsed, but it is to be understood that in collapsing, the second pivot link has absorbed energy.

If the vehicle is subjected to a severe rear impact, for example if the rear of the vehicle is hit by another vehicle at high speed, a very large rearwardly directed force is applied to the back of the seat. This force causes the pivot links 27,33 to pivot and the pivot pin 36 to move very rapidly to the rear of the triangular aperture 21 and into engagement with the edge of the apertured region 45 which defines an edge of the triangular aperture 21, as seen in FIG. 6. As the pivot pin 36 is moving rapidly, the pivot pin 36 strikes the edge of the apertured region 45 with a substantial force, causing the apertured region 45 to deform. The force exerted by the pivot pin 36 on the apertured region 45 continues to deform the apertured region 45, and the pivot pin 36 moves into the apertured region 45 as it deforms, until the pivot pin 36 reaches the other edge of the apertured region 45. When the pivot pin 36 reaches the other edge of the apertured region 45, the pivot pin is prevented from moving further by a part of the intermediate support plate 15 which has not been weakened by apertures, or reduced thickness, as seen in FIG. 7.

As the pivot pin 36 deforms the apertured region 45 some of the kinetic energy of the pivot pin 36 is absorbed. This means that the speed of the pivot pin 36 is reduced gradually, and the speed of the rearward movement of the seat back is also reduced gradually. This gradual slowing of the movement of the seat back may prevent the seat back from being stopped very suddenly, and this may help prevent an occupant of the seat from being injured as a consequence of the sudden stopping of the seat back.

Once the pivot pin 36 has moved through the apertured region 45, and been prevented from moving further rearwardly by the strong material of the intermediate support plate 15, the pivot pin 36 may still move upwardly, through the upper part of the apertured region 45. Therefore, the pivot pin 36 may be moved upwardly by the force of an occupant on the seat back, if the force applied to the seat back is sufficiently large until the pivot pin 36 is prevented from moving further upwardly by the material of the intermediate support plate 15, as seen in FIG. 8. When the pivot pin 36 moves upwardly, through the apertured region 45, the seat back tilts rearwardly and more energy is absorbed, and this additional absorption of energy helps dissipate the high level of energy which is associated with a very severe rear impact.

Whilst, in this preferred embodiment, the deformable structure is formed from a thin apertured region 45 of the intermediate support plate 15, in other embodiments the deformable structure may be formed from a separate element which is mounted to the intermediate support plate 15 to define an edge of the triangular aperture 21. Such an element may be made of, for instance, a metal foam, or alternatively a plastics material such as a polyurethane foam. In fact, the deformable structure may be formed from an element which is made of any kind of deformable material.

If the deformable structure is of a plastics material, such as plastics foam, the energy absorbing properties of the deformable structure will be different to the energy absorbing properties of a deformable structure which is of metal. A deformable structure which is of a plastics material may not necessarily deform plastically, but may still absorb energy from the pivot pin 36 as it moves into the foam, and act as a "cushion". In this case, the deformable structure could return automatically to its normal shape, if the pivot pin 36 is moved away from the deformable structure, without the deformable structure having to be replaced following a rear impact.

Referring now to FIGS. 9 to 11, an alternative embodiment incorporates a deformable structure which is in the form of a plurality of deformable fingers 46. In this alternative embodiment, the deformable fingers 46 are each formed integrally with the intermediate support plate 15 and form a row of fingers which together form one edge of the triangular aperture 21. The fingers 46 are spaced apart and each point generally downwardly, towards a lower edge of the triangular aperture 21. The ends of the fingers 46 are in line with one another, and effectively define an edge of a deformable structure and also define an edge of the triangular aperture 21.

In the event that a severe rear impact occurs, the pivot pin 36 strikes the ends of one or several of the fingers 46 with a substantial force, which causes the fingers 46 to deform. The force exerted on the fingers 46 by the pivot pin 36 bends the fingers 46 and the fingers may collapse or may move apart, thus absorbing energy. If the fingers move apart the pivot pin 36 moves between the fingers 46. The pivot pin 36 is stopped moving rearwardly by the material forming the bulk of the intermediate support plate 15, as shown in FIG. 10. When the pivot pin 36 is in this rearmost position, between the fingers 46, the pivot pin 36 is effectively caught between the fingers 46. If the seat back exerts a further force on the pivot pin 36, the pivot pin 36 moves upwardly, as the seat back tilts rearwardly, and the pin 36 deforms the fingers above it, until the pivot pin 36 is stopped by an upper part of the intermediate support plate 15, as seen in FIG. 11. As the pivot pin 36 is moved upwardly, additionally energy is absorbed as the upper fingers 46 are deformed.

Referring now to FIGS. 12 and 13, a further embodiment incorporates a deformable structure which is formed a single deformable finger 47 that is angled upwardly, the finger 47 extending across the mouth of a recess 48. The recess 48 is formed in a part of the intermediate support plate 15, and the finger 47 is formed integrally with the metal which forms the intermediate support plate 15. One side of the finger 47 defines an edge of the triangular aperture 21.

In the event that a severe rear impact occurs, the pivot pin 36 is moved into engagement with the finger 47, as the lower part of the seat back undergoes a rearward translatory movement. A force is exerted by the pivot pin 36 on the finger 47, and the finger 47 deforms into the recess 48. Thus energy is absorbed. The pivot pin 36 also moves into the recess 48, as the finger 47 deforms, until the pivot pin 36 is prevented from moving further rearwardly by the material forming the bulk of the intermediate support plate 15, as seen in FIG. 13.

When the pivot pin 36 is in the recess 48, the pivot pin 36 is prevented from moving upwardly, by an upper edge of the recess 48. This means that whilst the pivot pin 36 is in the recess 48, the pivot pin prevents the back of the seat from being tilted rearwardly. A rearward tilt in a high energy rear impact, in some circumstances, may injure the seat occupant.

Referring now to FIGS. 14 and 15, a still further embodiment has a deformable structure which is formed from a single deformable strip 49. The deformable strip 49 is formed integrally with the metal of the intermediate support plate 15, and the deformable strip 49 is positioned so that one edge of the deformable strip 49 defines one edge of the triangular aperture 21, and the other edge of the deformable strip 49 forms one edge of a diamond shaped slit 50 in the intermediate support plate 15, the slit 50 being positioned between the deformable strip 49 and the main body of the plate 15.

In the event that a severe rear impact occurs, the pivot pin 36 is moved into engagement with the deformable strip 49. Force exerted by the pivot pin 36 on the deformable strip 49 causes the deformable strip 49 to deform, and close the slit 50, as seen in FIG. 15. Thus energy is absorbed. The pivot pin 36 is prevented from moving further rearwardly by the material forming the deformable strip 49, as the material forming the deformable strip 49 is pressed against the metal bulk of the intermediate support plate 15. When the pivot pin 36 is at its rearmost position it may be prevented from moving upwardly, by an upper section of the deformable strip 49 which has effectively closed around the upper part of the pivot pin 36.

Referring now FIGS. 16 and 17 another embodiment has a moveable blocking element 51. The blocking element 51 is of generally rectangular shape with a rectangular slit 52 formed at one end of the blocking element 51. The end of the blocking element 51 is curved inwardly, to present a blocking face 53, with the blocking face 53 being adjacent the slit 52. The blocking element may be of metal, plastic or a composite material.

One end of the blocking element 51 is pivotally mounted to the support plate 15 by a shaft 54. The shaft 54 is situated above the triangular aperture 21 in the support plate 15. A leaf spring 55 is attached to the support plate 15, and the leaf spring 55 rotatably biases the blocking element 51 towards a position in which the blocking element 51 does not extend beyond the edge of the triangular aperture 21 (the position generally indicated by the lines in phantom of FIG. 16). During a rear impact the support plate 15 is accelerated forwardly by the force of the impact. The blocking element 51 has an inertia, which means that if the support plate 15 is accelerated forwardly a force is effectively exerted on the blocking element 51 in a rearward direction relative to the support plate 15.

In a low or average severity rear impact the support plate 15 is not accelerated very quickly, and thus the relative force on the blocking element 51 is low. In this case the low force on the blocking element 51 is not sufficient to overcome the force on the blocking element 51 which is exerted by the leaf spring 55. The blocking element 51 is thus retained in its normal position by the force of the leaf spring 55, and the mechanism can operate in its standard manner for a low or average severity rear impact.

In the event that a severe rear impact occurs the force exerted on the blocking element 51 is large, and is in excess of the force exerted on the blocking element 51 by the leaf spring 55. In this situation of the force of leaf spring 55 is overcome, and the blocking element 51 rotates about the shaft 54 in a rearward direction. When the blocking face 53 of the blocking element 51 is over the rear face of the triangular aperture 21 the blocking element 51 is locked in position by a catch (not shown). The pivot pin 36 is now moved into engagement with the blocking face 53 of the blocking element 51, as the pivot pin 36 undergoes its upward movement. Force exerted by the pivot pin 36 on the blocking face 53 causes the end of the blocking element 51 to deform, as the slit 52 is closed, as seen in FIG. 17. Energy is absorbed as the end of the blocking element 51 is deformed. Thus the rearward tilting of the back rest is minimised, and also energy is absorbed. In other embodiments the blocking element 51 may have a deformable body, or indeed any part of the blocking element 51 may be deformable so as to absorb energy from the pivot pin 36.

In an alternative embodiment the blocking element 51 may be moved into the position in which the blocking face 53 is over the rear edge of the triangular aperture 21 by another mechanism, such as a motor, which is controlled by a control unit having a sensor which senses a severe rear impact.

Referring now to FIGS. 18 to 21, a yet further embodiment has a substantially L shaped member in the form of an L shaped blocking element 56, which is pivotally mounted to the intermediate support plate 15. The L shaped blocking element 56, in this embodiment, is of metal, and is formed from an upper rectangular planar section 57 which is connected to a lower rectangular planar section 58. The upper section 57 and the lower section 58 are connected at an angle of approximately 45° to one another, and the area of the blocking element 56 where sections 57 and 58 are joined forms a corner section 59. An aperture is formed in the deformable element 56 in the corner section 59, and a pivot member 60 passes through the aperture and is fixed to a part of the intermediate support plate 15 which is adjacent the rear edge of the triangular aperture 21. The blocking element 56 is pivotable relative to the intermediate support plate 15.

A slit 61 is formed in the blocking element 56, and the slit 61 extends from the aperture in the corner section 59, and part-way along the lower section 58. The slit 61 is of narrower width than the diameter of the pivot member 60. The purpose of the slit 61 will become clear from the following description.

A leaf spring 62 is mounted to the pivot member 60, and the leaf spring 62 exerts a biasing force on the blocking element 56 to bias the blocking element 56 towards an initial position where the lower section 58 is overlapping the rear edge of the triangular aperture 21, as seen in FIG. 18. In other embodiments the L shaped blocking element 56 may be retained in the initial position by a frangible element in the form of a pin which is fixed, at one end to the support plate 15, and at the other end to the L shaped member 56. The frangible pin is configured to break if a force exerted on the L shaped member 56 exceeds a predetermined level.

In the event that a low or average severity rear impact occurs, the pivot pin 36 is moved, by the force of the occupant on the seat back, to a position where the pivot pin 36 engages the lower section 58 of the blocking element 56. The pivot pin 56 exerts a force on the lower section 58, and the force exerted by the pivot pin 36 is opposed to the bias of the leaf spring 62. In a low or average severity impact the force exerted by the pivot pin 36 on the lower section 58, is not in excess of the biasing force of the leaf spring 62. Therefore, the blocking element 56 remains in the initial position, and is not pivoted by the force exerted by the pivot pin 36.

After the pivot pin 36 has engaged the lower section 58, during a low or average severity rear impact, the pivot pin 36 is moved upwardly as the seat back is tilted rearwardly. The pivot pin 36 is able to move upwardly along the edge of the lower section 58 of the blocking element 56, until the pivot pin 36 contacts the rear edge of the triangular aperture 21, as seen in FIG. 19, and the pivot pin 36 may continue to move upwardly, within the constraints of the triangular aperture 21.

In the event of a severe rear impact, the pivot pin 36 is moved into engagement with the lower section 58 of the blocking element 56, and the pivot pin 36 exerts a large force on the lower section 58. This large force, as a result of the severe rear impact, is in excess of the biasing force of the leaf spring 62, and the blocking element 56 is therefore pivoted about the pivot member 60, until the pivot pin 36 comes into engagement with the rear edge of the triangular aperture 21, as seen in FIG. 20. As the blocking element 56 pivots, the lower section 58 is moved to a position where it does not overlap the edge of the triangular aperture 21. As the lower section 58 pivots, the upper section 57 pivots to a position where it does overlap the edge of the triangular aperture 21. Energy is absorbed as the leaf spring 62 is acted upon by the pivot pin 36. The blocking element 56 is locked in this position, with the upper section 57 overlapping the edge of the triangular aperture 21, by a lock (not shown).

When the blocking element 56 is locked in this position, upward movement of the pivot pin 36 is restricted by the upper section 57 of the blocking element 56. By restricting the upward movement of the pivot pin 36 in a severe impact, the back of the seat is prevented from tilting rearwardly, to minimise the possibility of the occupant being injured.

In a very severe rear impact an occupant of the seat may exert a very large force on the seat back, resulting in a very large amount of energy for the safety arrangement to absorb. In such a very severe rear impact, it is desirable for the seat back to partially tilt rearwardly, and absorb energy as it tilts partially rearwardly. The very large force which the seat occupant exerts on the seat back during a very severe rear impact, results in the pivot pin 36 exerting a very large upward force on the upper section 57 of the L shaped blocking element 56. This very large force on the L shaped blocking element 56 causes the part of the L shaped blocking element 56 around the slit 61 to be moved against the pivot member 60. As the L shaped blocking element 56 is of metal, the part of the L shaped blocking element 56 around the slit 61 is plastically deformable, but only if such a very large force is exerted on the L shaped blocking element 56. This very large force causes the L shaped blocking element 56 to be moved upwardly by the pivot pin 36, and the part of the L shaped blocking element 56 around the slit 61 to deform, and the L shaped blocking element 56 the moves, along the length of the slit 61, as shown in FIG. 21. This partial upward movement of the pivot pin 36 causes the seat back to tilt partially rearwardly, and as the part of the L shaped blocking element 56 around the slit 61 is deformed, energy is absorbed.

In other embodiments instead of the width of the slit 61 being narrower than the diameter of the pivot member 60 to restrict upward movement of the L shaped blocking element 56 a frangible element may be positioned within the slit 61, and normally in contact with the pivot member 60. A very large force resulting from a very severe rear impact can cause the frangible element to break to allow the L shaped blocking element 56 to move upwardly.

In yet further embodiments the upward movement of the L shaped blocking element 56 may be restricted by a plastically deformable element, or a resilient element such as a spring.

Referring now to FIGS. 22 to 24, an alternative embodiment has a hook shaped member in the form of hook shaped blocking element 63, which is pivotally mounted to the intermediate support plate 15. The hook shaped blocking element 63 is of metal and is formed from a long support section 64 and a shorter hook section 65. The hook section 65 is joined to the upper end of the support section 64, and is angled at approximately 90° to the longitudinal length of the support section 54. The hook shaped blocking element 63 is pivotally mounted at a point along the length of the support section 64, by a pivot rod 66, which is fixed to the intermediate support plate 15 and which passes through an aperture formed in the support section 64. A slit 67 of narrower width than the diameter of the pivot rod 66 is formed in the support section 64, and the slit 67 depends downwardly from where the pivot rod 66 extends through the aperture in the support section 64. The aperture forms the uppermost part of the slit 67, and the pivot rod 66 is thus accommodated in the upper part of the slit 67. The purpose of the slit 67 will be described in detail below.

The part of the support section 64 which is below the pivot rod 66 and the slit 67 is enlarged to form a weight 68. The weight 68 is of metal and formed integrally with the support section 64 but is of greater thickness than the part of the support section 64 which is above the pivot rod 66. The weight 68, below the pivot rod 66, has a greater moment of inertia about the pivot than the part of the support section 64 which is above the pivot rod 66. The purpose of the weight 68 and the greater moment of inertia will become clear from the description below.

A leaf spring 69 resiliently biases the hook shaped blocking element 63 towards a normal condition in which the hook section 65 does not overlap the edge of the triangular aperture 21 in the intermediate support plate 15, as seen in FIG. 22. The leaf spring 69 provides a rotational biasing force which is in excess of a rotational force which arises from the centre of gravity of the weight 68 being offset from below the pivot rod 66.

In the event that the vehicle is involved in a low or average severity rear impact, the mechanism undergoes a rapid acceleration forwardly, in the direction generally indicated by arrow 70. As the mechanism is accelerated forwardly, the pivot rod 66 is accelerated forwardly at the same rate. The hook shaped blocking element 63 on the other hand is pivotally mounted to the intermediate support plate 15, and thus able to pivot relative to the intermediate support plate 15. As the moment of inertia of the weight 68, on the lower side of the pivot rod 66 is greater than that of the support section 64 and hook section 65 on the upper side of the pivot rod 66, the force resulting from the moment of inertia of the weight 68 is greater than the force resulting from the moment of inertia of the support section 64. However, in a low or average severity rear impact the force resulting from the moment of inertia of the weight 68 is not in excess of the biasing force of the leaf spring 69. Therefore, in a low or average severity rear impact the hook shaped blocking element 63 remains in its normal condition, and upward movement of the pivot pin 36 is not restricted, to allow the seat back to tilt rearwardly to absorb energy.

In the event that the vehicle is involved in a severe rear impact the force resulting from the moment of inertia of the weight 68 is in excess of the biasing force of the leaf spring 69. Therefore, the weight 68 effectively moves rearwardly, relative to the pivot rod 66, causing the hook shaped blocking element to rotate in an anticlockwise direction about the pivot rod 66. The hook shaped element 64 rotates until it is in a blocking position, in which the hook section 65 is overlapping the edge of the triangular aperture 21 as seen in FIG. 23. When the hook shaped blocking element 63 reaches the blocking position it is locked in place by a locking arrangement (not shown). Such a locking arrangement may be a ratchet, or a locking pin which engages part of the hook shaped blocking element 63 to retain it in the blocking position. When the hook shaped blocking element 63 is locked in the blocking position, the hook section 65 restricts upward movement of the pivot pin 36, and prevents the seat back from tilting rearwardly and potentially injuring an occupant of the seat.

In the event that a very severe rear impact occurs, the moment of inertia of the weight 68 once again causes the hook shaped blocking element 63 pivot to the blocking position, to restrict upward movement of the pivot pin 36. However, as the rear impact is very severe, the pivot pin 36 exerts a very large upward force on the hook section 65 of the hook shaped blocking element 63. This very large upward force causes the hook shaped blocking element 63 to move upwardly relative to the pivot rod 66, and the pivot rod 66 to deform the part of the hook shaped blocking elements 63 which is around the slit 67. As the hook shaped blocking element 63 is made of metal, the area around the slit 67 deforms plastically, and absorbs energy. Thus, further energy resulting from the very severe rear impact is absorbed.

Whilst in this alternative embodiment the upward movement of the hook shaped blocking element is restricted by the narrow width of the slit 67 relative to the pivot rod 66, the movement could alternatively be restricted by a frangible element, within the slit 67, or by a resilient element such as a spring.

It is to be appreciated that whilst, in the described embodiment, an intermediate support plate 15 is provided, the only real function of the intermediate support plate 15 is to permit a forward-tilting of the entire back of the seat. If a seat back support mechanism is to be provided in a seat which is not present in a two-door car, then the intermediate support plate could be omitted. In such a case, the apertures 21, 22 and 24 could be formed in the rear main support plate 3. The locking lever 18 would also be omitted.

Whilst the release element 23 has been described as being a frangible pin, the release element 23 could constitute a mechanical or electro-mechanical arrangement adapted to retract a pin in response to a signal from an appropriate sensor. The sensor may comprise a sensor adapted to respond to a acceleration of the vehicle in excess of the predetermined threshold. The sensor may automatically retract a pin which initially engages the aperture 28 in the pivot link 27, thus releasing the pivot link 27. Alternatively, a retractable pin may be retracted by means of a solenoid.

In yet further embodiments, the release element 23 may be a resilient element such as a spring, which is configured to deform resiliently if the force on the seat back is above a predetermined level, to allow the seat back to undergo the translatory rearward movement.

It is to be appreciated that further modifications may be effected to the invention without departing from the scope of the following Claims.

When used in this specification and claims, the terms "comprises" and "comprising" and variations thereof mean that the specified features, steps or integers are included. The terms are not to be interpreted to exclude the presence of other features, steps or components.

The invention claimed is:

1. A seat back support mechanism for supporting the back of a seat in a motor vehicle relative to a squab of the seat, the seat back support mechanism comprising:
   at least one external support plate adapted to be interconnected to the squab;
   a support arm adapted to be connected to the back of the seat; and
   a linkage interconnecting the at least one support arm to the at least one external support plate for relative motion therebetween the linkage including two pivot link elements and an intermediate support plate the intermediate support plate at least indirectly coupled to the at least one external support plate, defining an opening and including a deformable structure disposed adjacent the opening, the pivot link elements moveable relative to the intermediate support plate, the pivot link elements each being mounted to effect pivotal movement of the intermediate support plate relative to the at least one external support plate, the pivot link elements at least indirectly supporting the support arm, the linkage further including a member at least indirectly coupled to the support arm, the member moveable in response to movement of the support arm, the member normally received within the opening of the intermediate member and moveable into engagement with the deformable structure to deform the deformable member in response to a force in excess of a predetermined threshold;
   whereby the linkage normally permits rearward tilting of the back of the seat and the linkage prevents rearward movement of the back of the seat in response to the force in excess of predetermined threshold.

2. The mechanism according to claim 1, wherein the deformable structure includes at least one deformable finger positioned in a recess adjacent to the opening in the intermediate support plate, such that when the member moves into engagement with the at least one finger and deforms the at least one finger, the member moves into the recess and upward movement of the member is restricted by an upper side of the recess.

3. The mechanism according to claim 1, wherein the deformable structure is formed by a region of the intermediate support plate of reduced thickness which incorporates apertures.

4. The mechanism according to claim 2, wherein the deformable structure is formed by a single deformable finger.

5. The mechanism according to claim 2, wherein the opening of the intermediate member is generally triangular and the deformable structure defines a side of the opening.

6. The mechanism according to claim 5, wherein the generally triangular opening allows for rearward tilting of the back of the seat and the recess prevents rearward tilting of the back of the seat.

7. The mechanism according to claim 1, wherein a release member is provided to prevent premature movement of the pivot links.

8. The mechanism according to claim 7, wherein the release member comprises a frangible member.

9. The mechanism according to claim 7, wherein the release member is mechanically or electro-mechanically operated.

10. The mechanism according to claim 1, further comprising a locking mechanism to lock the intermediate support plate in position.

11. The mechanism according to claim 10, wherein the locking mechanism includes a pivotally mounted lever which initially engages the intermediate support plate to lock the intermediate support plate in position, and is movable to a position in which the lever is disengaged from the intermediate support plate to permit a pivoting movement of the intermediate support plate.

12. A vehicle seat incorporating a support mechanism according to claim 1.

13. A seat back support mechanism for supporting a back of a seat in a motor vehicle, the seat back support mechanism comprising:
   at least one external support plate adapted to be connected to one of a squab of the seat and a frame supporting the squab of the seat;
   at least one support arm adapted to be connected to the back of the seat, the at least one support arm interconnected to the at least one external support plate for pivotal action;
   a linkage coupling the at least one external support plate and the at least one support arm for relative pivotal movement the linkage including:
      an intermediate support plate defining a main opening, a recess, and a deformable element between the main opening and the recess, the main opening having a first width, the recess having a second width, the first width being substantially greater than the second width;
      two pivot link elements the pivot link elements moveable relative to the intermediate support plate, the pivot link elements each being mounted to effect pivotal movement of the intermediate support plate relative to the at least one external support plate, the pivot link elements at least indirectly supporting the support arm, the pivot link elements normally permitting tilting of the back of the seat, the deformable element adapted to deform to prevent tilting of the back of the seat when the seat is subjected to a force in excess of a predetermined threshold; and a moveable member at least indirectly coupled to the support arm and moveable in response to movement of the support arm, the moveable member being moveable into engagement with the deformable element.

14. The mechanism according to claim 13, wherein the moveable member is a pivot shaft for one of the two pivot link elements having an end extending into the opening of the intermediate support plate.

15. The mechanism according to claim 13, wherein the main opening is generally triangular and the deformable element defines one side of the main opening.

16. The mechanism according to claim 13, wherein the deformable element includes at least one deformable finger.

17. The mechanism according to claim 16, wherein the deformable element includes a single deformable finger.

18. The mechanism according to claim 13, wherein the energy absorbing structure is formed from one deformable finger positioned in the recess in the intermediate support plate, such that when the member moves into engagement with the finger, and deforms the finger, the member moves into the recess, and upward movement of the member is restricted by an upper side of the recess.

19. The mechanism according to claim 13, in combination with the seat.

20. The mechanism according to claim 13, wherein the energy absorbing structure is formed integrally with the intermediate support plate.

21. The mechanism according to claim 13, wherein the energy absorbing structure is more readily deformable than the intermediate support plate.

22. A seatback support mechanism for adjustably coupling a back of a seat to a squab, the mechanism comprising:
at least one support plate adapted to be interconnected to the squab;
at least one support arm adapted to be connected to the back of the seat;
an intermediate support plate defining an opening with a main portion and a recess portion, the main portion having a width substantially greater than the recess portion, a deformable element separating the main portion and the recess portion;
a recliner support plate; and
a parallel linkage between the intermediate support plate and the recliner support plate, the parallel linkage including a first link and a second link, a first pivot shaft interconnecting the intermediate support plate and the recliner support plate and extending through the first link, a second pivot shaft extending from the recliner support plate, through the first link and into the opening of the intermediate support plate, a third pivot shaft connecting the recliner support plate and the second link, a fourth pivot shaft connecting the second link and the intermediate support plate;
whereby the second pivot shaft deforms the deformable element in response to a force in excess of a predetermined threshold such that the second pivot shaft moves into the recess and upward movement of the second pivot shaft is restricted by an upper side of the recess.

23. The seatback support mechanism according to claim 22, wherein the deformable element is a deformable finger.

24. The seatback support mechanism according to claim 22, wherein the main portion of the opening is generally triangular.

25. The seatback support mechanism according to claim 24, wherein the deformable element defines one side of the main portion of the opening.

26. The seatback support mechanism according to claim 22, wherein the main body portion is generally triangular and allows for rearward tilting of the back of the seat and the recess prevents rearward tilting of the back of the seat.

27. A seatback support mechanism for adjustably coupling a back of a vehicle seat to a squab, the mechanism comprising:
a squab support structure adapted to be interconnected to the squab;
a seat back support structure adapted to be interconnected to the back of the seat;
a linkage moveably interconnecting the squab support structure and the seat back support structure, the linkage including a moveable member at least indirectly carried by one of the squab support structure and the seat back support structure and a plate at least indirectly carried by the other of the squab support structure and the seat back support structure, the plate defining an opening for receiving the moveable member and a recess adjacent the opening, the plate further including a deformable member disposed between the opening and the recess, the moveable member normally disposed in the opening and the linkage normally permitting rearward tilting of the back of the vehicle seat, the moveable member operable to deform the deformable member and move into the recess in response to a force in excess of a predetermined threshold, the linkage operable to prevent rearward tilting of the back of the vehicle seat when the moveable member is in the recess.

28. The seatback support mechanism of claim 27, whereby the linkage permits rearward tilting of the back of the seat relative to the squab when the moveable member is in the opening and prevents rearward tilting of the back of the seat relative to the squab when the moveable member is in the recess.

29. The seatback support mechanism according to claim 27, wherein the squab support structure includes at least one support plate.

30. The seatback support mechanism according to claim 27, wherein the seat back support structure includes at least one support arm.

31. The seatback support mechanism according to claim 27, wherein the moveable member is at least indirectly carried by the seat back support structure and the plate is carried by the squab support structure.

32. The seatback support mechanism according to claim 27, wherein the opening in the plate is generally triangular.

33. The seatback support mechanism according to claim 32, wherein the deformable member defines a side of the opening.

34. The seatback support mechanism according to claim 27, wherein the deformable member is a deformable finger.

35. The seatback support mechanism according to claim 34, wherein when the moveable member moves into engagement with the deformable finger and deforms the deformable finger, the moveable member moves into the recess and upward movement of the moveable member is restricted by an upper side of the recess.

36. The seatback support mechanism according to claim 27, in combination with the vehicle seat.

* * * * *